April 8, 1952     W. M. ZAIKOWSKY     2,591,759
THERMAL CONDUCTIVITY GAS ANALYZER
Filed March 1, 1943     5 Sheets-Sheet 1
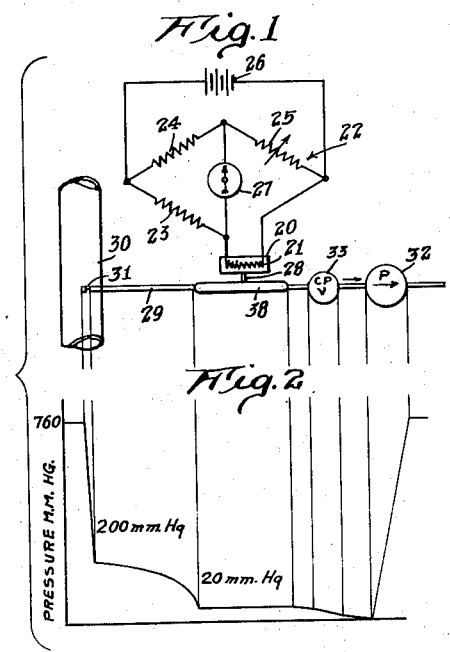
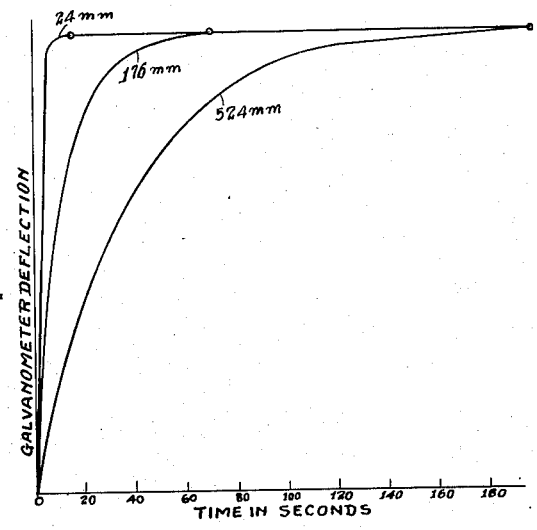
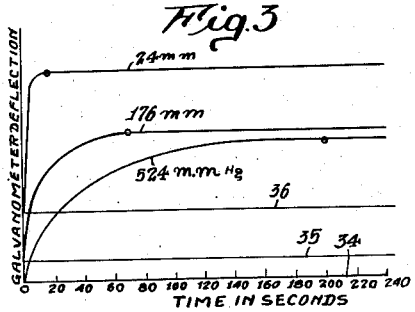
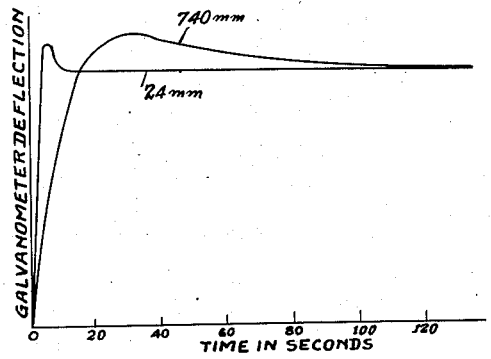
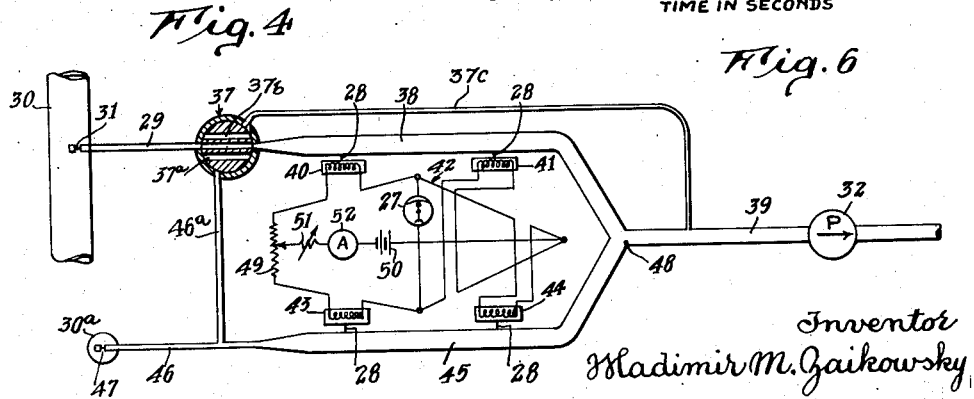
Inventor
Wladimir M. Zaikowsky
By Lyon & Lyon Attorneys April 8, 1952     W. M. ZAIKOWSKY     2,591,759
THERMAL CONDUCTIVITY GAS ANALYZER
Filed March 1, 1943     5 Sheets-Sheet 2
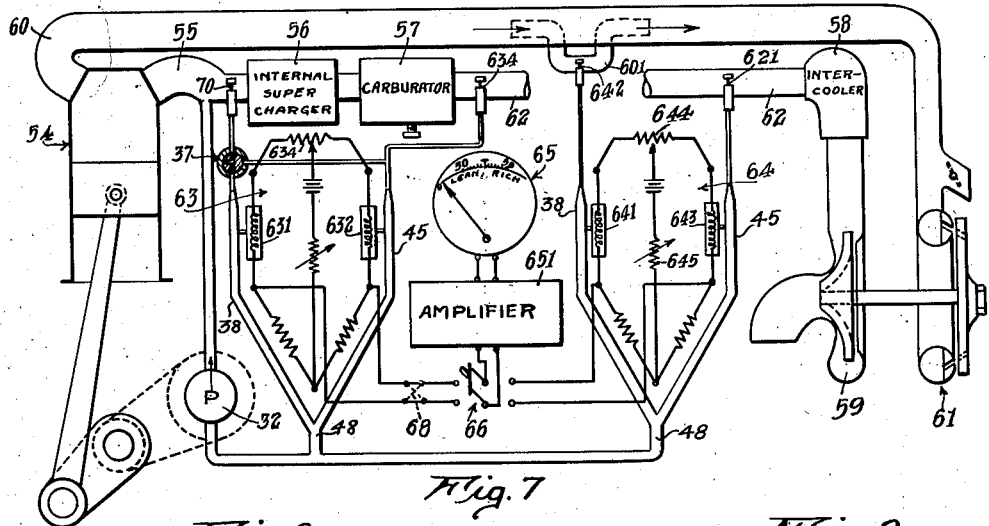
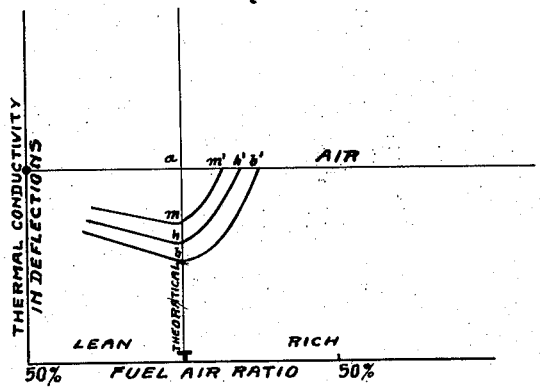
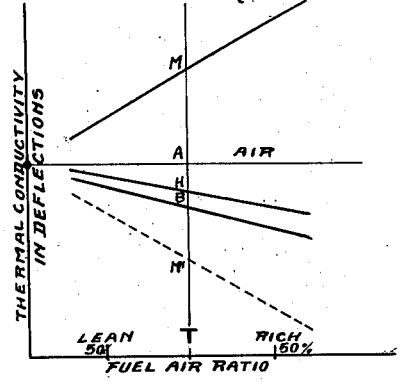
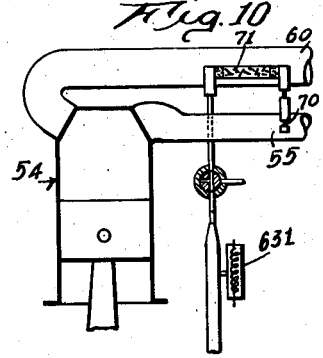
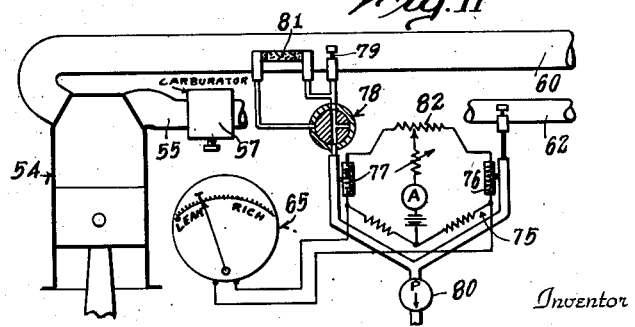

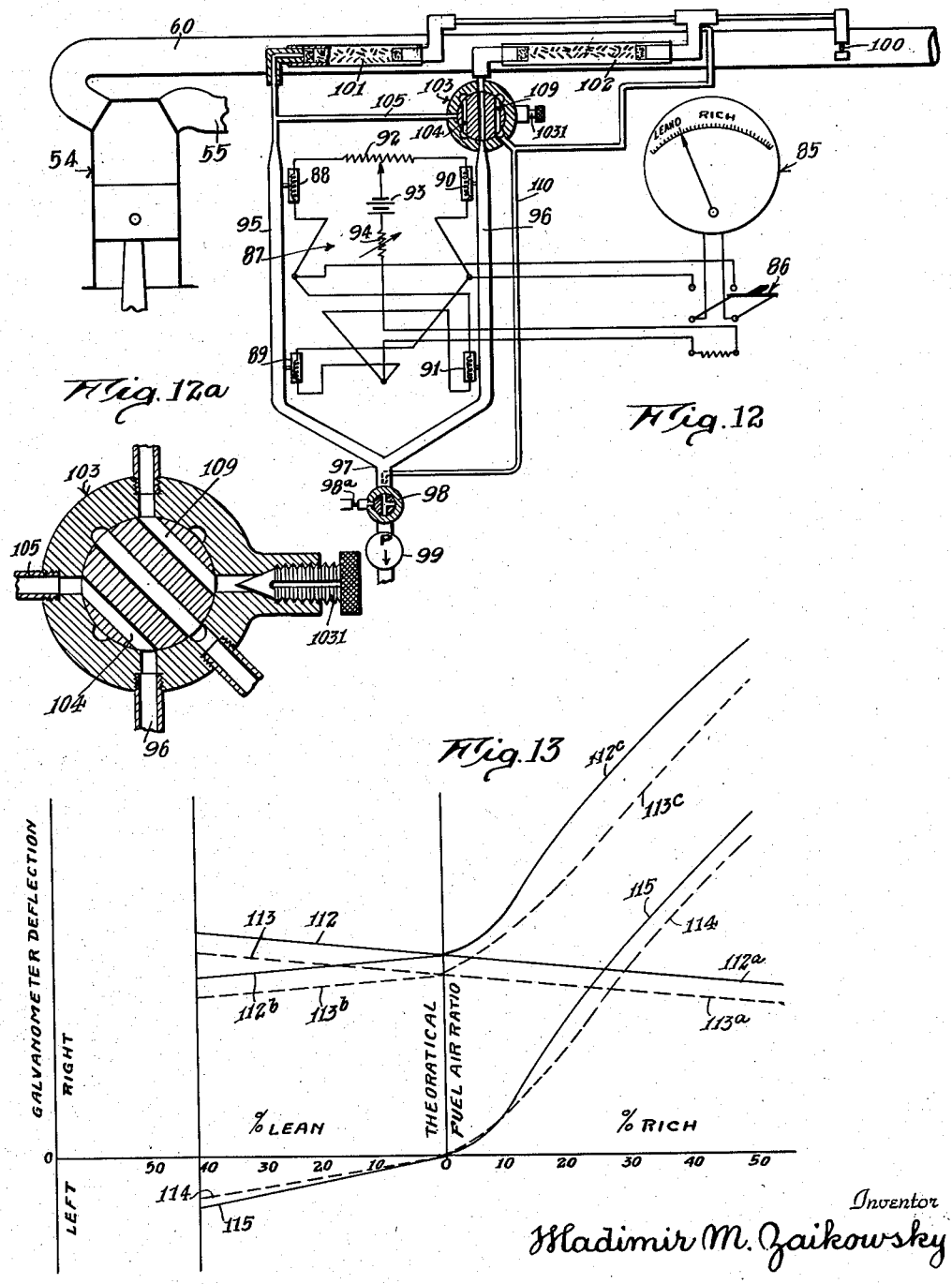

April 8, 1952 W. M. ZAIKOWSKY 2,591,759
THERMAL CONDUCTIVITY GAS ANALYZER
Filed March 1, 1943 5 Sheets-Sheet 4

Inventor
Vladimir M. Zaikowsky
By Lyon & Lyon
Attorneys

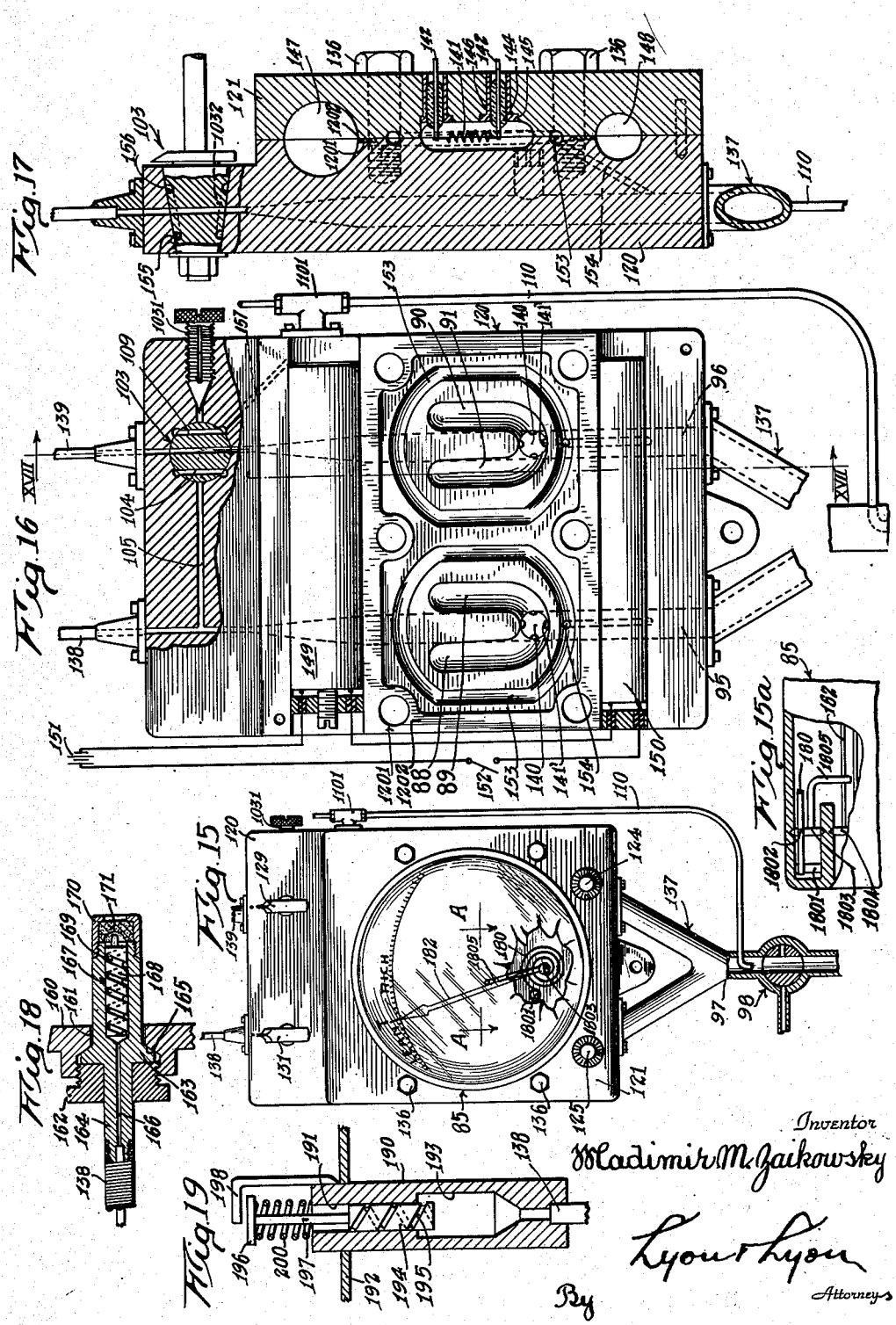

Patented Apr. 8, 1952

2,591,759

UNITED STATES PATENT OFFICE 2,591,759

THERMAL CONDUCTIVITY GAS ANALYZER

Wladimir M. Zaikowsky, Pasadena, Calif.,
assignor to Nina D. Zaikowsky

Application March 1, 1943, Serial No. 477,675

26 Claims. (Cl. 73—27)

This invention relates to gas analysis by the thermal-conductivity method, in which the reduction in temperature of an electrically heated wire caused by contact of the gas therewith is measured or indicated. Such methods, as previously known, are discussed in detail in numerous publications including a book entitled "Gas Analysis by Measurement of Thermal-Conductivity," published in 1933 by H. A. Daynes, to which reference is made.

The analysis of gases by thermal-conductivity measurements has been practiced extensively because it permits continuous testing of a stream of gas, and can be accomplished with apparatus that is relatively simple and rugged. Obviously these properties are of great importance in, for instance, apparatus for indicating to an airplane pilot whether the combustible mixture supplied to his engine is correct, too lean, or too rich.

However, the prior methods and apparatus employed for measuring the thermal-conductivity of gases have defects, some of the most serious of which are listed as follows:

1. There is a substantial time lag between a change in composition of the gas, and an indication of that change by the instrument.

2. The results are relatively inaccurate in certain types of service.

3. The instruments are subject to rapid deterioration in certain types of service.

4. The instruments may be disabled by the presence of dust or water or other liquid in the gas being tested.

It is a general object of the present invention to reduce the foregoing defects of the prior methods and apparatus, and the manner in which this is accomplished will become apparent from the description to follow.

In all practical thermal-conductivity gas analyzing apparatus, the gas is delivered to an analyzing cell consisting of a chamber containing an electrically heated wire or filament which varies its resistance with a change in temperature, and apparatus (usually a Wheatstone bridge) is connected in the energizing circuit for indicating the variations in resistance.

An important feature of the present invention is the flow of the gas to the analyzing cells at pressures greatly reduced below atmospheric. This may be accomplished by placing a constriction in the line leading to the cell, connecting the line leading away from the cell to a suction pump, and continuously expanding the gas to be tested by reducing the pressure thereof to a value substantially less than atmospheric and greater than that at which the length of the mean free path of the gas being tested becomes comparable in magnitude to the spacing between the heated resistor and the walls of the cell. I have found that this enormously increases the speed of response of the cell to changes in compositions of the gas stream, makes it possible to indicate rapid fluctuations in composition where it was impossible before, enormously reduces the rate of contamination of the cells by the gas, and enables the testing of gases carrying liquid in suspension where it was impossible before. I have successfully employed pressures from three to fifty millimeters of mercury, but these values are not critical, and the pressure to be employed in any particular case will depend upon various factors, particularly the pumping apparatus that is available.

With respect to the accurate indication of rapid variations in composition of a gas stream, obviously if an apparatus has a response lag of one minute, it will not respond effectively to a variation in composition lasting ten seconds. Any thermal-conductivity analyzing apparatus for testing a stream of gas gives at any instant an indication of the average value of the thermal-conductivity of the gas stream over an interval of time. The faster the response of the apparatus, the shorter is this interval of time over which the thermal-conductivity of the stream is averaged. It is, therefore, apparent that in reducing the time lag of the apparatus, I have increased its sensitivity to rapid fluctuations in the composition of the gas.

Another important feature of my invention is the provision for automatically maintaining equal pressure in a pair of isolated cells for comparing different gases expanded to a reduced pressure. This makes reading substantially independent of the particular value of pressure to which gas is expanded, within a wide range of gas pressures.

In all thermal-conductivity gas analysis apparatus for continuous testing of a gas stream, the hot filaments are subject to contamination by the gas being tested, and prior inventors have sought to overcome this defect by filtering the gas to eliminate the contaminating substances. My invention supplements these known prior practices by reducing the total quantity of the contaminating substance reaching the filament, irrespective of whether the contaminating substance is the gas or gases being tested for, or extraneous matter present in the gas or gases tested for.

The presence of liquids, such as water, in a gas being tested, is particularly aggravating because it may short-circuit the filament or cool it by evaporation; furthermore, it is difficult to clear out of the cell. My invention largely eliminates this defect because at the low pressure I employ, most liquids, particularly water, are maintained in the vapor phase. Because of this fact, I can test gas containing substantial water, where others have had to first dry the gas before testing it.

Another feature of the invention is the separate treatment and comparison of the thermal conductivities at low pressures of two streams of the gas being tested, instead of comparing the thermal conductivity of the gas being tested with that of an extraneous gas, such as air or water vapor. For example, I have found that by dividing a stream of exhaust gas to be analyzed into two streams, treating one stream with a suitable solid oxidizing agent, treating the other stream with a suitable solid reducing agent, and then comparing the thermal-conductivities of the two streams, important advantages are obtained. One advantage is that when the mixture of fuel and air is perfect for complete combustion, the thermal-conductivities of the two streams are the same, because normally there is nothing in the exhaust gas to be either oxidized or reduced; hence the neutral or zero position of the meter that indicates differences in thermal-conductivities of the two streams, corresponds to the position for a perfect mixture.

This greatly simplifies calibration of the instrument. Another important advantage is that the relative thermal-conductivities of the two treated streams of gas vary relatively uniformly over the entire useful range, and vary in opposite directions for rich and lean mixtures respectively, independently of the particular formula of the fuel; thereby making it possible to accurately calibrate the instrument for direct reading with all fuels. Although this feature of the invention may be useful in some instances without the concurrent use of the feature of low pressure, the two features are particularly useful in combination because the use of the low pressure greatly reduces the total mass of the gas that must be treated in a given time, and correspondingly prolongs the effective life of a given quantity of the treating agent. As a result of flowing the gas stream at low pressure, it is sometimes possible to construct practicable gas analysis apparatus employing an oxidizing, a reducing, or some other reagent, whereas the quantity of such reagent required to treat a gas stream at normal pressures would be prohibitive.

Other specific features will become apparent from the detailed description to follow which refers to the drawing.

In the drawings:

Fig. 1 is a schematic diagram of a simple embodiment of the invention.

Fig. 2 is a graph illustrating the pressures existent in different parts of the system of Fig. 1.

Fig. 3 is a graph illustrating the performance characteristics of the system of Fig. 1 under different pressures.

Fig. 4 is a schematic diagram of a second embodiment of the invention.

Figs. 5 and 6 are graphs showing the performance characteristics of the system of Fig. 4.

Fig. 7 is a schematic diagram of a third embodiment of the invention as applied to exhaust gas analysis.

Figs. 8 and 9 are graphs illustrating the performance characteristics of the system of Figs. 7 and 11.

Fig. 10 is a schematic diagram showing a modification of the system of Fig. 7.

Fig. 11 is a schematic diagram showing still another modification of the system of Fig. 7.

Fig. 12 is a schematic diagram of still another embodiment of the invention for exhaust gas analysis.

Fig. 12a is a detail of a value of Fig. 12, showing it in a different position.

Fig. 13 is a graph illustrating the performance characteristics of the system of Fig. 12.

Fig. 15 is a front elevation view of the apparatus shown in perspective in Fig. 14.

Fig. 15a is a detail section taken along the line A—A in Fig. 15.

Fig. 16 is a front elevation of the rear block of the apparatus shown in Fig. 14.

Fig. 17 is a vertical section taken along the line 17—17 of Fig. 16.

Fig. 18 is a longitudinal sectional view of a constriction that may be employed in the practice of the invention.

Fig. 19 is a view similar to Fig. 18 showing an alternative constriction.

Figure 14:
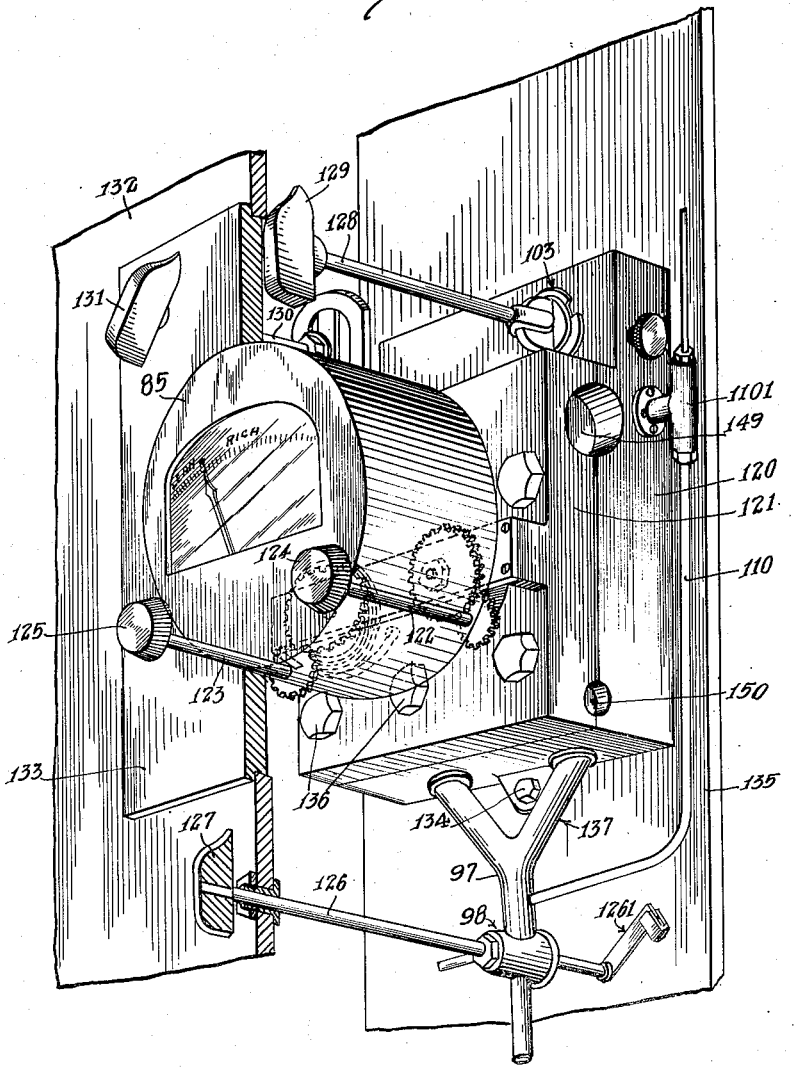
Fig. 14 is a perspective view with parts broken away showing actual apparatus that may be employed in the system of Fig. 12.

Referring first to Fig. 1, there is disclosed a simple apparatus for gas analysis by the thermal-conductivity method, comprising a test cell 20 containing a resistor 21, which resistor constitutes one arm of a Wheatstone bridge 22. The remaining arms of the bridge may comprise two fixed resistors 23 and 24 respectively and a variable resistor 25. A source of current indicated as a battery 26 is connected across one diagonal of the bridge and a galvanometer 27 is connected across the other diagonal in accordance with conventional practice. The cell 20 consists of a chamber having thermally conductive walls and connected by a diffusion passage 28 to a test passage 38 in a conduit 29 through which the gas to be analyzed flows. This gas may be taken from a pipe 39, which might be the exhaust pipe of an internal combustion engine, the flue of a furnace, or any other passage through which gas is flowing.

It will be understood that the current supplied from the battery 26 divides between the resistor 25 and the resistor 21, and the current flowing through the latter heats it sufficiently above the temperature of the wall of the chamber within which it is positioned so that there is a constant loss of heat from the resistor 21 to the walls of the chamber by radiation and by transfer through the gas. The loss of heat through the gas is in part due to convection and in part due to the thermal-conductivity of the gas, which is a function of its molecular activity. Different gases may have different thermal-conductivities, which it is the function of the apparatus to detect, and it is desirable to make the loss of heat by convection small as compared to the loss by thermal-conduction.

The resistor 21 is of a material such as platinum having an electrical resistance that varies substantially with change in temperature, so that its resistance is changed in response to a change in thermal-conductivity of the gas in the chamber and is indicated by a deflection of the galvanometer 27.

The construction so far described is conventional. The present invention, as applied to Fig.

1, resides in continuously flowing gas from the pipe 30 through the conduit 29, and test passage 38, past the entrance of the diffusion passage 28 at low pressure. This is accomplished in the system of Fig. 1 by providing a constriction 31 adjacent the input end of the conduit 29 and a suction pump 32 at the output end of the conduit. If desired, a pressure control valve 33 can be inserted in the conduit 29 head of the pump 32 to maintain the pressure constant at the input of the diffusion passage 28. The pressure control valve 33 is desirable, among other reasons, because the pressure drop across the constriction 31 and in the conduit 29 will vary with different gases. Hence without an automatic pressure regulator such as the valve 33, the pressure in the passage 38 might vary considerably with a change in composition of the gas, even though all other features remain the same.

The pressures that may prevail in different portions of the system of Fig. 1 are illustrated in the graph of Fig. 2. Thus the pressure within the pipe 30 may be 760 mm. Hg, whereas the pressure produced by the suction pump 32 at its inlet end may be in the neighborhood of 10 mm. Hg. Pressures at intermediate points will vary as shown in Fig. 2. Thus a relatively large pressure drop occurs across the constriction 31 so that the pressure at the outlet end of the constriction may be approximately 200 mm. Hg. There may then be a further drop in the conduit 29 between the constriction 31 and the test passage 38 so that the pressure at the latter may be 20 mm. Hg. A slight additional pressure drop may exist in the conduit 29 between the test passage 38 and the pressure regulating valve 33 and a further relatively large drop may occur within the pressure regulator itself followed by a slight drop in the section of the conduit 29 between the regulator 33 and the pump 32. Beyond the pump 32 the pressure rises to atmospheric pressure which, in this instance, is the same as the pressure within the pipe 30.

As is well known in the art, gas transfer will occur by diffusion through the diffusion passage 28 between the test passage 38 and the test cell 20, that the composition of gas within the chamber will, after an interval of time, conform with the composition of the gas in the test passage 38, provided the latter remains constant.

It is advantageous to transfer the gas to be analyzed to the test cell by diffusion because it controls the cooling effect of said transfer on the resistor 21 more uniformly than an induced convection would and thereby increases the accuracy of the apparatus.

The present invention results from my utilization of two characteristics of gases, namely: (1) the thermal-conductivity of a gas is substantially independent of its pressure, within very large limits; (2) the rate of diffusion of a gas and its velocity of flow through a conduit are greatly increased by a reduction in the pressure. Hence, in the system of Fig. 1, the lag between a change in composition of the gas flowing in the pipe 30 and an indication of this change by the galvanometer 27 is greatly reduced by reducing the pressure within the conduit 29.

Thus in Fig. 3, there are shown three curves corresponding to three different pressures indicating the time required for the hand of the galvanometer 27 to come to rest following a change in composition of the gas flowing in the pipe 30 from atmospheric air to a mixture of $CO_2$ 16.3%, and $N_2$ 83.7%. The lower curve indicates the movement of the galvanometer hand following a change in composition of the gas in the pipe 30 when the pressure within the conduit 38 (2) is maintained at approximately 524 mm. Hg. It will be observed that the curve rises gradually and flattens out after approximately 200 seconds.

The intermediate curve represents the performance at a pressure of 176 mm. Hg within the conduit 38 (2). It will be observed that this curve rises more rapidly and flattens out after about 70 seconds.

The upper curve represents the movement of the galvanometer hand when the pressure in the conduit 29 is only 24 mm. Hg. It rises very steeply and flattens out after about 15 seconds.

The curves in Fig. 3 were plotted from experimental data and do not represent the pressure limits of operation. By further reducing the pressure to values below 5 mm. Hg, I have proportionately further shortened the time of response.

It is to be noted in connection with Fig. 3 that the final, constant deflections represented by the three curves become progressively greater as the pressure is reduced. This is because the cooling effect of the gas on the resistor 21 due to other causes than thermal-conductivity decreases as the pressure is reduced, and the change in composition represented by the curves of Fig. 3 is from a gas mixture of higher thermal conductivity to one of lower thermal conductivity. However, it is important to note that the variation in deflection represented by all the curves is substantially the same. Thus the vertical distance from the base line 34 to the flat portion of the lower curve is substantially equal to the vertical distance from the base line 35 to the flat portion of the intermediate curve and to the distance from the base line 36 to the flat portion of the upper curve.

In apparatus of the simple type shown in Fig. 1, it is desirable to maintain the pressure in the passage 38 substantially constant at all times, to avoid errors in reading such as are indicated in Fig. 3. I have found, however, that it is possible to substantially eliminate errors due to variations in pressure by employing a system in which the test cell is balanced against a reference cell containing a reference gas at the same pressure as the test gas. Such a system is illustrated in Fig. 4.

Referring to Fig. 4, there is shown a pipe 30 which may correspond to the pipe 30 of Fig. 1 and which contains a stream of gas to be analyzed. A portion of this gas is conveyed through a constriction 31 and conduit 29, thence through a valve 37 to a test passage 38, from which it is exhausted through an exhaust conduit 39 by a suction pump 32. The test passage 38 communicates through diffusion passages 28 with two test cells 40 and 41, respectively, which contain resistors connected in diagonally opposite arms of a bridge 42. The other arms of the bridge consist of similar resistors in test cells 43 and 44 which are connected by diffusion passages to a reference passage 45, similar to the test passage 38 but connected at its input end by a conduit 46 and a resistor 47 to a source of reference gas in a pipe $30^a$ which gas in this instance is atmospheric air. The output end of the reference passage 45 communicates with the output end of the test passage 38 at the junction 48.

The bridge 42 comprises, in addition to the resistors of the four test cells, a balancing potentiometer 49, the variable tap of which constitutes one diagonal point of the bridge. The energizing battery 50 is shown connected between one pair of diagonals of the bridge through a variable resistor or rheostat 51 and an ammeter 52 whereby the amplitude of deflection of the galvanometer can be adjusted by varying the resistor 51 to vary the total current flowing through the bridge and the cells. The galvanometer 27 is connected between the other diagonals of the bridge.

It is to be understood that the resistors of either the cells 40 and 43 or the cells 41 and 44 could be replaced by fixed resistors, but the use of reference and test cells in all four arms of the bridge in the manner shown increases the sensitivity.

The valve 37 is provided to facilitate balancing of the bridge. Thus by rotating this valve slightly counter-clockwise, the test passage 38 can be connected, by the valve passage 37a, to a branch passage 46a leading to the conduit 46 so that the reference gas is passed through both the reference passage 45 and the test passage 38, and the potentiometer 49 can be adjusted to give zero deflection on the galvanometer 27. Thereafter the valve 37 can be restored to normal position to admit the gas being tested into the test passage 38.

It will be observed that when the passage 37a interconnects the passages 46a and 38, the passage 37b connects the passage 29 leading from constriction 31 to the exhaust conduit 39, through a by-pass conduit 37c.

The graph of Fig. 5 shows the performance characteristics of a system such as has been described in connection with Fig. 4 at three different pressures corresponding to those of the curves shown in Fig. 3. It will be observed that the three curves of Fig. 5 flatten out in substantially the same times as do the three curves of Fig. 3. Thus the lower curve representing operation at a pressure of 524 mm. Hg flattens out after about 200 seconds. The intermediate curve representing operation at a pressure of 176 mm. Hg flattens out after about 70 seconds, and the upper curve representing operation at 24 mm. Hg flattens out after about 15 seconds.

The great advantage of the system of Fig. 4 over that of Fig. 1 is evident from comparison of Fig. 5 with Fig. 3 and is that the final deflection is independent of the pressure. Thus whereas the initial and final points on the three curves of Fig. 3 are all at different levels, the starting and end points of the three curves of Fig. 5 are all the same. Hence in the system of Fig. 4 it is not essential to accuracy that the pressure be maintained within narrow limits. It will be understood, however, that the lower the pressure the faster will be the response of the instrument to a variation in composition of the gas.

Operation of thermal-conductivity gas analysis apparatus at low pressure has another advantage in that it reduces errors resulting from selective diffusion of different gases to the test cell. For instance, if in the system of Fig. 4 a stream of air flowing in the pipe 30 is suddenly replaced by a mixture containing 1.5% helium (estimated), 8.3% carbon dioxide, and 90.2% nitrogen, the deflection of the galvanometer under two different pressure conditions of the gas is shown by the two curves of Fig. 6. One curve represents the deflection at a pressure of 740 mm. Hg, and the other represents the performance at a pressure of 24 mm. Hg. It will be observed that at the higher pressure the galvanometer hand over-shoots and then gradually drops back to a steady value, requiring approximately 120 seconds to stabilize. At the lower pressure of operation, the galvanometer also over-shoots but it returns very rapidly, acquiring a stable value in approximately 15 seconds. The over-shooting is caused by the fact that the helium and the nitrogen in the mixture not only have higher thermal-conductivities than the carbon dioxide, but also diffuse more rapidly, these functions being interdependent. Therefore, as the mixture of helium, carbon dioxide and nitrogen displaces the air, the helium and the nitrogen outrun the carbon dioxide, causing an initial excessive concentration of those gases in the test cells. This condition is only transient, the carbon dioxide eventually attaining a concentration in the test cell corresponding to its proportion of the mixture. But it is apparent from Fig. 6 that it requires much longer for the excess of the more rapidly diffusing gases to be dissipated from the test cells at the high pressure of 740 mm. Hg than the lower pressure of 24 mm. Hg.

When the pressure is maintained the same in the test passage 38 and the reference passage 45, there is, in ordinary practice, no perceptible change of sensitivity with changes in pressure down to 20 mm. Hg and very little change down to 3 mm. Hg. However, by confining operation to a narrow range of low pressures the diffusion passage can be made of shorter length and larger cross-section, and the diffusion time further reduced; but the reading may be affected by a wide range of pressure changes.

In order to maintain the pressures the same in the passages 38 and 45, these passages should be of substantial cross-section up to the junction 48. On the other hand, these passages should not be too large adjacent the junction 48 else the velocity of flow might drop below the velocity of diffusion, causing transfer of the gas in one of the passages 38 or 45 to the other, with resultant inaccuracy in the reading.

It is also important that the speed of flow of the gases past the inlet end of the constriction 31 be sufficiently great to prevent selective diffusion in the case of a mixture of gases of different diffusion rates, because this would result in a higher concentration in the test cells of the gas having a higher diffusion rate. To avoid such errors, it is desirable to position the inlet end of the constriction 31 close to the center of the stream of gas to be analyzed. For this reason the constriction 31 in Figs. 1 and 4 has been shown closely adjacent the center of the pipe 30.

In some instances, the gas to be analyzed may contain high boiling point components capable of being condensed if the temperature is materially reduced by expansion through the constriction. In such instances sufficient heat should be supplied to the constriction and conduit 29 to prevent condensation.

The test passage 38 in Figs. 1 and 4 and the reference passage 45 in Fig. 4 should be smooth and sufficiently large to provide for smooth flow of the gas therethrough without drop of pressure, in order to prevent transfer of gas to and from the cells other than by diffusion. However, it is desirable that the conduits 29 be relatively small so that the velocity of gas therein is high. This reduces the time lag involved in the passage of a given amount of gas from the constriction 31 to the test passage 38. High velocity in the conduit 29 is also desirable because it tends to keep the conduit clean. In practice I have employed thermometer tubing having a 1 mm. bore for the conduit 29. With such tubing the conduit 29 can be from 10 to 20 feet long without introducing excessive time lag.

Thermal-conductivity gas analysis apparatus is used extensively in the analysis of exhaust gas of internal combustion engines to determine when the mixture of air and fuel supplied to the engine is correct or has a permissible ratio. Such apparatus is employed extensively on aeroplanes because the high duty engines there employed are critical as to the fuel-air mixture employed and can be quickly damaged if the mixture becomes too lean. My invention is particularly useful in exhaust gas analysis apparatus because it is very important that the response of the indicating instrument follow quickly an adjustment of the mixture supplied to the engine.

One of numerous methods of employing the invention for exhaust gas analysis is illustrated in Fig. 7 in which an internal combustion engine 54 has an intake manifold 55 connected through an internal supercharger 56, a carburetor 57, an inter-cooler 58, and an external supercharger 59 to the atmosphere, and has an exhaust manifold 60 connected to a supercharger turbine 61 which drives the external supercharger 59. The general arrangement described is common on aeroplanes. In accordance with the present invention I provide gas analysis equipment for directly comparing the thermal-conductivity of the exhaust gas in the exhaust manifold 60 with reference air in the intake pipe 62, and for directly comparing the thermal-conductivity of the fuel-air mixture in the intake manifold 55 with reference air in the pipe 62. To this end I provide two bridges 63 and 64, respectively, which cooperate with a common meter 65 and amplifier 651. Each of the bridges 63 and 64 may be of standard construction similar to that described in connection with Fig. 4 except that to simplify the diagram, only one test cell and one reference cell is employed in each bridge, two arms of each bridge being constituted by fixed resistors.

The bridge 64 has one test cell 641 exposed to exhaust gas received from the exhaust manifold 60 through a constriction 642 positioned in a by-pass 601, and another test cell 643 exposed to air received from the intake pipe 62 through a constriction 621. The bridge 63 has one test cell 631 exposed to the unburned mixture of fuel and air received from the intake manifold 55 through a constriction 70, and another test cell 632 exposed to air received through a constriction 634 from the air pipe 62. The air is taken from the pipe 62 because it is maintained at a fairly uniform pressure in that pipe by the supercharger 59 irrespective of altitude. Because the pressures in pipe 62, and also in the intake manifold 55, are largely independent of altitude, the suction pump 32 may advantageously have its discharge duct connected to the intake manifold 55 as shown in Fig. 7. The pump 32 is preferably directly driven by the engine, as is diagrammatically indicated, so that the requisite low pressures are maintained in the test cells whenever the engine is running.

As the first step in the operation of the apparatus of Fig. 7, the meter 65 is connected to the bridge 63 by the double-throw switch 66, and the valve 37 (corresponding to the valve 37 of Fig. 4) is turned to admit air into both test cells 631 and 632, and the bridge is balanced by adjustment of the potentiometer 634 to apply no voltage to, and produce no deflection of, the galvanometer 65. After the bridge 63 has been so balanced, no further adjustment of the bridge elements is necessary. The valve 37 is then restored to normal position to admit fuel-air mixture from the intake manifold 55 to the test cell 631.

As the next step in the operation of the apparatus, the double-throw-switch 66 is thrown to the right to connect the bridge 64 to the meter 65, and the potentiometer 644 or the variable resistor 645 is adjusted to bring the hand of the galvanometer to an arbitrary position near the middle of the scale. The meter is now responsive to the differences in the thermal-conductivity of the exhaust gas in the cell 641 and the air in 643, and it is to be understood that the galvanometer is so poled that when the thermal-conductivity of the exhaust diminishes, the needle moves to the left side of the scale. The carburetor is now adjusted until the hand of the galvanometer is shifted to its leftmost position which indicates that the engine is running on the theoretically correct mixture. Thus, variations of the thermal-conductivity of the exhaust gas of an internal combustion engine with variations in the fuel-air ratio, are shown for three different fuels in Fig. 8, from which it will be observed that the lowest point on each one of the three curves occurs at the theoretically perfect mixture. If the mixture becomes excessively lean, the thermal-conductivity rises gradually. If the mixture becomes excessively rich, the thermal-conductivity rises rapidly.

After having adjusted the carburetor until the bridge 64 shows that the exhaust gas has reached the minimum thermal-conductivity, the switch 66 is again thrown to the left to re-connect the meter 65 across the bridge 63 which, it will be remembered, has previously been balanced to produce no deflection of the galvanometer when the same gas is applied to both cells 631 and 632. The gain of the amplifier 651 is then adjusted to bring the hand of the meter 65 to the "T" point of the scale, indicating theoretically perfect mixture while the engine continues to run on the same mixture. Thereafter, if the mixture becomes richer, the hand of the meter will swing to the right, giving a direct indication of the richness, or, if it becomes too lean, the hand of the meter will swing to the left to give a direct indication of the leanness.

Obviously, the reversing switch 68 must be so positioned with respect to the nature of the fuel, that a richer mixture moves the hand to the right, and a leaner mixture moves it to the left. Such a switch may be necessary because, as shown in Fig. 9, the thermal-conductivity of a fuel-air mixture increases with richness when the fuel is methane, but decreases when the fuel is hexane or benzene.

The reason the meter, when connected to the bridge 63 and adjusted in the manner described, will give a direct indication of a rich or a lean mixture is that the thermal-conductivity of the fuel-air mixture varies continuously in the same direction with a variation in fuel-air ratio, instead of attaining a minimum value at the theoretical fuel-air mixture, as does the exhaust gas. Thus referring again to Fig. 9, the three solid line curves M, H and B, show the thermal-conductivities of different fuel-air ratios, when the fuels consist of methane, hexane and benzene, respectively. It will be apparent from these curves that although the fuel-air mixtures for different fuels, do not vary their thermal-conductivities in the same direction or to the same degree, each fuel either increases or decreases its thermal-conductivity over the entire range of fuel-air ratios, and in a linear manner.

It will be apparent from the foregoing discussion that it is possible to employ a single scale on the meter 65 to give directly an indication of the fuel-air ratio of any one of a variety of fuels, but the gain of the amplifier 651 must be adjusted if the fuel is changed. The calibration of the instrument can be checked at any time by throwing the switch 66 to the right to connect the bridge 64 to the meter 65, and then adjusting the carburetor to see if the thermal-conductivity was at the minimum.

In Fig. 9 the dotted curve M' indicates a transposition of the solid curve M which, in practice, would be effected by actuating the reversing switch 68 of Fig. 7.

It has already been pointed out, with reference to Fig. 8, that in the neighborhood of theoretical mixtures, the variations of the thermal-conductivities are small, and it is highly desirable to employ the amplifier 651 because by it the sensitivity of the system can readily be increased to facilitate the determination of the minimum conductivity with the bridge 64. The amplifier is also desirable because it permits adjustment of the sensitivity of the bridge 63 to adapt it for different fuels without varying the current through the bridge. The amplifier makes possible high sensitivity with low temperature of the resistors in cells 631 and 632 which is important when mixture is explosive, however, at low pressure no explosion will occur.

It might be assumed that the general system of Fig. 7 could be employed with prior known thermal-conductivity measuring apparatus in which the gases are admitted to the test and reference cells at normal pressures. Actually it is often not feasible to do this because response of the meter is so slow that it is extremely difficult to determine the point of minimum thermal-conductivity of the exhaust gas mixture. In making this test, the operator must first make an arbitrary adjustment on the carburetor and then carefully observe the meter to see whether the adjustment increased or decreased the thermal-conductivity. If the adjustment decreased the thermal-conductivity, then the operator makes further adjustments in the same direction until the thermal-conductivity ceases to fall and begins to rise. The movements of the galvanometer hand are very slight, near the critical point, and if the operator has to wait many seconds for a response, then the movement occasioned by the actual change in thermal-conductivity of the gas may be obscured by wandering of the needle from extraneous causes. Therefore, it is essential in order for the apparatus of Fig. 7 to be practicable, that the gases be tested at greatly reduced pressures by drawing them through small constrictions by a suction pump as shown.

It is also essential to employ subatmospheric pressures in the test cells of Fig. 7, particularly the test cell 631 of bridge 63, because the unburned fuel air mixture in the intake manifold 55 may contain unvaporized fuel components carried in suspension which, if they reached the test cell in liquid form, would cause errors and might disable the cell. Hence such condensable substances must not be permitted to accumulate in the passages and cells. Expansion to a low pressure with appropriate heat supply at the zone of expansion adjacent the constriction 70 lowers the vapor pressure of the condensable constituents and maintains them in the vapor stage during their passage through and past the test cell.

It is also very important that the speed of response be made as great as possible by suitable reduction of the pressure of the gas because it enables completion of a test before a change in the operation of the engine occurs.

The use of low pressure in connection with the bridge 64 for testing the exhaust gas is also important for the prevention of the condensation of water vapor in the exhaust during its passage through the apparatus. As an example, for a theoretical mixture of air and octane the exhaust contains 14% of water vapor by volume and at sea level pressure of 760 mm. Hg such exhaust would have a water vapor pressure of 168 mm. Hg and a dew point temperature of 60° C. However, after expanding such exhaust gas to a pressure of 20 mm. Hg, the water vapor pressure is lowered to approximately 4.4 mm. Hg and the dew point is lowered to approximately 0° C., so that no condensation of water vapor will occur at ordinary temperatures. The heat necessary to supply the latent heat of vaporization of the water as it is expanded can be readily supplied from the exhaust manifold itself. However, the gas should not be taken from the exhaust manifold at a point where the temperature is high enough to cause accumulations of soot to burn when the mixture becomes lean, since the combustion of the soot would prevent the attainment of a true indication of the condition of the mixture supplied to the engine.

The described method gives, for various gasolines, readings substantially corrected for variation in atmospheric humidity, because it produces equal increments of water concentration in moist exhaust and atmospheric air.

Furthermore, readings are substantially independent of air and exhaust pressures, making this method particularly useful for airplane engines.

An advantage of directly measuring the thermal conductivity of the input mixture in the intake manifold 55 is that errors resulting from the presence of lubricating oil either burned or unburned are eliminated; such oil, or oil products, are sometimes present in the exhaust. It is desirable that the fuel air mixture be picked up where it is strongly agitated and preheated; hence it is preferably taken off on the engine side of the internal supercharger 56 when the latter device is present. Furthermore, by positioning the constriction 70 close to the block of the engine 54, the latter will supply sufficient heat for complete vaporization.

It will be apparent from Fig. 8 that the variation in thermal conductivity of exhaust gas resulting from lean mixtures is very slight and it is therefore desirable that the testing apparatus be relatively sensitive. This is also true of the fuel-air mixtures shown in Fig. 9. However, it is important to note that a lower sensitivity of the instrument can be tolerated when the response of the instrument is fast than when it is slow. Thus a very minor movement of the meter hand is apparent if it occurs quickly, whereas it might not be noted at all if the movement occurred very gradually over a substantial interval of time.

The property of the system of Fig. 7, whereby it can be readily calibrated to give accurate readings with different fuels, is highly desirable in practice because, ordinarily, fuels available at different points of refueling are of different composition and the composition is not known to the pilot.

It will be observed that regardless of the fuel employed, the deflection of the galvanometer when connected to bridge 63, becomes nil when the fuel concentration is zero, since the gas in both cell 631 and cell 632 is then air. (In Fig. 9, all the curves, if extended to the left, intersect at the air line). Therefore, if the galvanometer has a uniform scale and the left end of the scale is the rest point of the hand when no current is applied to the galvanometer, the deflection of the galvanometer will be proportional to the fuel concentration when the thermal conductivity of the fuel-air mixture is compared with air. In other words, the deflection for a mixture 50% lean, will be at a point midway between the left end of the scale and the point "T" indicating theoretical mixtrue, and a mixture 50% rich will be indicated by movement of the hand to a position half way between the point "T" and the right end of the scale.

The great advantage of the complete system shown in Fig. 7, is that by employing the bridge 64 only for initial adjustment of the gain of amplifier 651 to adapt the bridge 63 for fuels of different composition, the meter 65 will accurately indicate by movement of the hand to the left or to the right from the point "T," whether the mixture is excessively lean or excessively rich. However, it is to be understood that the bridge 64 can be employed alone in many instances, although the meter will then indicate only departures from theoretical mixture without indicating whether the departure is in the lean direction or in the rich direction. However, the bridge 64 can be adjusted to produce deflections of the same magnitude for a given departure from theoretical mixture for any fuel, by suitable adjustment. In other words, it is possible with my invention and employing only the bridge 64 of Fig. 7, to use a single calibrated meter scale with a variety of fuels.

Thus, referring again to Fig. 8, the three curves $b$, $h$ and $m$, represent thermal conductivities of different fuel-air ratios employing the fuels methane, hexane, and benzene, respectively. These curves indicate that although the thermal conductivity of the exhaust is at the minimum when the fuel-air ratio is theoretical, for all three fuels, the actual thermal conductivities are different for the different fuels. Nevertheless, by the following procedure, the bridge 64 can be quickly adjusted to cause the hand to be positioned at the "T" point on the scale when the mixture is theoretical, irrespective of the composition of the fuel.

With the switch 66 thrown to the right to connect the bridge 64 to the meter, the carburetor is first adjusted until the theoretical fuel-air ratio is arrived at as indicated by maximum movement of the hand to the left. This leftmost position of the hand might, however, be at any one of many points on the scale, either to the left or to the right of the point "T," depending upon the adjustment of the gain of the amplifier 651. After the theoretical ratio has been found in this way, the pointer of the galvanometer is shifted to the "T" point on the scale by adjustment of the potentiometer 644, while the engine continues to run on the theoretical mixture. The effect of such adjustment can be illustrated in Fig. 8, for example, by shifting the curve $b$ upwards until the low point thereon coincides with the low point on the curve $h$. Irrespective of whether the instrument scale was originally calibrated for hexane or for benzol, it will, after such adjustment, correctly indicate the theoretical fuel-air ratio, and the indications of lean and rich mixtures will be sufficiently accurate for most purposes. It will be remembered, however, that the needle will move to the right of the point "T" irrespective of whether the departure from theoretical mixture is in the lean direction or the rich direction, and in this form the apparatus is preferably used only to indicate rich mixture. Oftentimes, it is only necessary to have apparatus capable of indicating the composition of mixtures richer than theoretical. Thus, it is customary to operate aeroplane engines on mixtures varying from 10% to 40% richer than theoretical, and for service on such engines, the apparatus just described will often be adequate.

In the prior known systems for gas analysis by thermal-conductivity measurements, it has been the practice to condense excess water from the exhaust gas before directing the gas to the test cell, because, at the high (atmospheric) pressures employed, such moisture might be condensed in the cell, with resultant disablement thereof. Unfortunately, however, it requires time to condense water from the exhaust gas, thereby increasing the lag of the instrument; and a great advantage of my system is that it eliminates this lag by eliminating the necessity of condensing the water from the exhaust. As previously pointed out, the reason for this is that at the reduced pressures I employ, the water can remain in the vapor phase. The presence of the uncondensed water of combustion in the exhaust gas somewhat reduces the sensitivity for slightly lean mixtures (tending to flatten the curves of Fig. 8 to the left of the center line), but this defect is more than counterbalanced by the fact that the reading does not vary with variations in atmospheric pressure, and requires no correction for the temperature of saturation of the air in a reference cell (it being customary in the prior practice to employ water-saturated air in the reference cell).

The curves of Fig. 8 are for dried exhaust gases. The curves for undried exhaust gas have different shapes, and the theoretical points on the curves are not spaced as far below the "air" line; nevertheless, the detection of the theoretical mixture can be successfully accomplished by my method as described.

It may be desirable in some instances to burn the input mixture by reaction with a solid oxidizing reagent such as copper oxide before applying it to the test cell 631, as this provides a steeper variation of thermal-conductivity in response to a variation in fuel air ratio. An arrangement for accomplishing this is shown in Fig. 10 in which the gas after passing through the constriction 70 is conveyed through a tube 71 containing copper oxide and positioned within the exhaust manifold 60 so that it is heated to a suitable reacting temperature. The expanded fuel-air mixture, after passing through the tube 71, is conveyed to the test cell 631. The remainder of the apparatus remains exactly as shown in Fig. 7. It is feasible to oxidize the unburned fuel-air mixture as shown in Fig. 10 when the pressure of the gas is reduced to a low value because it greatly reduces the total quantity of gas flowing to the cell and thereby greatly reduces the quantity of reagent (copper oxide in this instance) required to oxidize it.

It is also possible to treat the exhaust gas so that its thermal-conductivity varies continually in the same direction with a variation in the fuel-air ratio, and a simple apparatus for operation in this manner is illustrated in the schematic diagram of Fig. 11 which shows a portion of the exhaust and intake system of Fig. 7 in combination with a single bridge 75 having a reference cell 76 exposed to air from the intake pipe 62 and a test cell 77 which may be supplied through a valve 78 either with untreated or treated exhaust gas from the exhaust manifold 60. When the valve is in the position shown, untreated exhaust gas, after being expanded by passage through the constriction 79, is conveyed directly past the test cell 77 and thence to the exhaust pump 80. However, if the valve 78 is rotated 90° clockwise, then gas can no longer pass directly from the constriction 79 to the test cell but must flow through a tube 81, positioned within the exhaust manifold 60 for heating purposes and thence through the valve 78 to the test cells 77.

The apparatus of Fig. 11 is operated as follows: First, with the current adjusted to the value for which the meter scale is calibrated, the valve 78 is positioned as shown in the drawing so that untreated exhaust gas is delivered to the cell 77, and the carburetor 57 is adjusted until the meter 65 indicates minimum thermal-conductivity. Then the bridge is balanced by adjustment of the potentiometer 82 to bring the hand of the meter to the "T" point on the scale, indicating theoretical mixture. Thereafter, the valve 78 is rotated 90° clockwise, causing exhaust gas to pass through the treating tube 81 and thence to the cell 77. The treating tube 81 may contain an oxidizing reagent such as copper oxide, or it may contain a reducing agent such as solid carbon. If an oxidizing agent is employed, then all unburned fuel in the exhaust is oxidized and the thermal-conductivity of the gas reaching the cell 77, instead of having the characteristic shown in Fig. 8, gradually and continuously decreases in thermal-conductivity as the mixture becomes richer. On the other hand, if the tube 81 contains a reducing agent such as carbon, then all excess oxygen in the exhaust is burned to carbon dioxide and the resultant gas reaching the cell 77 will show a continuously lower thermal-conductivity as the mixture varies from rich to lean. In either event, the scale of the meter 65 can be calibrated so that the hand will indicate directly whether the mixture is theoretically correct, too lean, or too rich.

It is to be noted that it is possible and may sometimes be desirable to eliminate the valve 37 of Figs. 4 and 7. Thus, if conditions of operation permit, the bridge can be initially balanced before the pump is started, at which time the gas will have become identical in all the cells by diffusion through the interconnecting passages. The fact that the pressure is atmospheric, with consequent slow response of the instrument, is of no moment, because the composition of the gas is not changing.

It will also be understood that it is not necessary, in Fig. 7, to employ the same galvanometer for both bridges 63 and 64.

Important advantages can be realized with my system by employing a completely different technique for indicating the richness or leanness of a mixture supplied to an internal combustion engine or other combustion device. This new technique involves the comparison with each other of two differently treated streams of the exhaust gas instead of comparing the exhaust gas or the input gas with some fixed reference gas such as air.

Various systems of gas analysis described herein that involve the oxidation or reduction of exhaust gases are claimed in my copending divisional application Serial No. 672,472 filed May 27, 1946.

Apparatus for employing this new technique is illustrated in Fig. 12, which discloses an engine 54 having an intake manifold 55 and an exhaust manifold 60, the same as described in connection with Fig. 7, it being understood that the additional elements of the engine shown in Fig. 7, such as the carburetor, will be present. They have been eliminated from Fig. 12 in the interest of simplicity.

The testing apparatus comprises as its essential elements a specially designed and calibrated meter 85 adapted to be connected by a double pole, double throw switch 86 to a bridge 87 having four test cells 88, 89, 90 and 91, respectively, connected in the four arms thereof. The usual balancing potentiometer 92, battery 93, and current-adjusting resistor 94, are provided.

The two test cells 88 and 89 are connected in diagonally opposite arms of the bridge but are associated with a common passage 95. The other two test cells 90 and 91 are positioned in the other two arms of the bridge and are associated with a common passage 96. The output ends of these two passages 95 and 96 are connected together at a junction 97 and through a valve 98 to an exhaust pump 99. The valve 98 normally connects the junction 97 to the pump 99, but, when turned counterclockwise 90°, admits atmospheric air through a constriction 98ᵃ to the junction 97 for a purpose to be later described.

The two passages 95 and 96, respectively, are supplied with exhaust gas from the exhaust manifold 60 preferably through a common constriction 100, but through two separate treating tubes 101 and 102, respectively. It may be assumed that the treating tube 101 contains carbon and that the treating tube 102 contains copper oxide. Both treating tubes are shown positioned within the exhaust manifold 60 so that they will be heated to suitable reacting temperatures by the exhaust gases, but the heating could be done in a separate furnace. The outlet of the treating tube 101 is permanently connected to the passage 95 but a valve 103 is provided between the treating tube 102 and the passage 96. In its normal position, this valve functions only to admit gas from the tube 102 to the passage 96. When the valve 103 is turned counterclockwise through an angle of 45° as shown in Fig. 12a, a passage 104 in the valve connects the passage 96 through a conduit 105 with the passage 95 so that gas passing through the treating tube 101 is admitted to both the passages 95 and 96; and a passage 109 in the valve admits air through a needle valve 1031 into the outlet end of the treating tube 102.

The single meter 85 is employed both to indicate the condition of balance of the bridge and the current flowing through the bridge. When the switch 86 is thrown into its upper position, the meter is connected across the bridge. When the switch is thrown to its lower position, the meter is connected in shunt to a resistor 111 permanently connected in series with the variable resistor 94 and the battery 93. The resistor 111 is provided to decrease the sensitivity of the meter 85 when it is connected to show the current flowing through the bridge, because the total current delivered to the bridge is enormously great as compared to the current that flows through the meter in response to unbalance of the bridge when the switch 86 is in its upper position.

The apparatus of Fig. 12 is operated as follows: First the switch 86 is thrown into lower position and the total current flowing in the bridge is adjusted by resistor 94 until the meter 85 indicates a predetermined value for which the system has been calibrated. The switch 86 is then restored to its upper position. Then the valve 103 is swung counterclockwise to admit the same gas from the treating tube 101 through both test channels 95 and 96, and the bridge is balanced by adjusting the potentiometer 92 until the meter shows zero current. This particular meter is in neutral position, both mechanically and electrically, and indicates zero current, when the hand is at O. Finally the valve 103 is restored to its normal position, as shown in Fig. 12. Thereafter, exhaust gas treated with hot carbon in the tube 101 passes through the passage 95, and exhaust gas treated by the hot copper oxide in tube 102 passes through passage 96. These two differently treated gases will have the same thermal-conductivity if the mixture is theoretically correct, but will vary from equality in one direction if the mixture becomes too rich and in the other direction if it becomes too lean, so that the meter 85 will automatically give a direct indication of the quality of the mixture.

The reason for this will be explained with reference to Fig. 13, in which a solid curve 112—112$^c$ and a dash curve 113—113$^3$ show the variations in thermal-conductivities of the exhausts of two fuel-air mixtures, in which the fuel is octane and benzol, respectively. These curves show that a meter calibrated to indicate a minimum thermal-conductivity with one fuel might be grossly inaccurate with a different fuel.

Considering now the effect on the thermal-conductivity of the exhaust of treating it with heated copper oxide, the left part 112 or 113 of the curve remains unchanged because there is nothing to oxidize in a lean mixture. On the other hand, the right part 112$^c$ or 113$^c$ is drastically altered, because the unburned fuel gases in the exhaust of a rich mixture have a higher thermal-conductivity than do their products of combustion. Actually, the right (rich) portions of the thermal-conductivity curves for exhaust treated with copper oxide (the gas in passage 96 of Fig. 12) are substantially straight extensions of the left portions, as indicated at 112$^a$ and 113$^a$ in Fig. 13.

In the preparation of the curves of Fig. 13, it has been assumed that in continuous operation the copper oxide tube may contain enough reduced copper to absorb the oxygen in the lean mixture.

Considering next the effect on the thermal-conductivity of the exhaust of treating it with hot carbon, the right part 112$^c$ or 113$^c$ of the curve remains unchanged because there is no oxygen to combine with the carbon in a rich mixture. The left part 112 or 113 of the curve is altered, because the excess oxygen in a lean mixture has a higher thermal-conductivity than do the products of combustion of the carbon. Hence, the exhaust of a lean mixture, which normally has a thermal-conductivity indicated by the curve 112 or 113, will have a thermal-conductivity by the curve 112$^b$ or 113$^b$ after treatment with hot carbon.

It is to be understood that under certain conditions of engine operation, oxides of nitrogen may be present in the exhaust, as well as oxygen, and they are capable of reaction with heated carbon. It may be desirable when the amount of nitrogen oxide is appreciable, to decompose or absorb them in a separate treating tube, but it is not ordinarily necessary.

It will be apparent that in the system of Fig. 12, one sample of treated exhaust having the thermal-conductivity characteristics shown by the curve 112—112$^a$ or 113—113$^a$ is compared with a second sample of treated exhaust having the thermal-conductivity characteristic shown by the curve 112$^b$—112$^c$ or 113$^b$—113$^c$. It will be observed that the two samples compared have the same thermal-conductivity at the theoretical ratio irrespective of the fuel employed, since they intersect at that point.

In Fig. 13, the upper curves represent variations in thermal-conductivity that would be obtained if the exhaust samples identified therewith were compared against a fixed reference gas, such as air, but they do not necessarily represent the exact galvanometer readings, and their vertical position in the graph with respect to the vertical position of the lower curves 114 and 115 has no significance. Irrespective to this, when the two samples treated with hot carbon and with copper oxide, respectively, are compared with each other in the system of Fig. 12, the actual galvanometer readings correspond to the differentials of the upper curves, and the resultant differential curve 114 represents the galvanometer readings actually obtained for different fuel-air ratios when benzol is the fuel, and the curve 115 represents actual galvanometer readings obtained for different fuel-air ratios when the fuel is octane. These curves 114 and 115 have several interesting characteristics:

(1) They both pass through zero at the theoretically perfect mixture. Hence, if the system is calibrated to show zero reading on meter 85 in Fig. 12, for theoretically perfect ratio of one fuel, it is calibrated to show zero reading with the theoretical ratio of any fuel. Furthermore, the bridge 87 can be balanced for zero current at theoretically perfect mixture, so that the normal position of rest of the meter hand is at zero, and variations in the current in the bridge, produced by varying the resistor 94 for the purpose of varying the sensitivity, can be made without shifting the hand away from zero position. In actual practice, the balance of the bridge can be quickly tested at any time by simply throwing the valve 103 into the position shown in Fig. 12a to admit the same gas from the treating tube 101 into both of the passages 95 and 96.

(2) The curves 114 and 115 vary in opposite directions for lean and rich mixtures, respectively, so that the meter hand moves in one direction away from the zero point to indicate lean mixtures, and in the opposite direction away from the zero point to indicate rich mixtures. This eliminates all the disadvantages of attempting to determine the minimum thermal-conductivity of the gas.

(3) The two curves 114 and 115 differ from each other only slightly at any part of their range and differ scarcely at all closely adjacent the zero point. This makes it possible to adjust the bridge to the same sensitivity for all fuels and eliminates the necessity of separately calibrating it for each particular fuel that may be employed.

(4) The slopes of the curves for lean mixtures, although less than the slopes for rich mixtures, are appreciably greater than the slopes of the curves 112, 112b, 113, and 113b, thereby giving superior sensitivity in the lean range, as compared with that obtainable in prior known arrangements.

It has previously been indicated that the operator can check the balance of the bridge in the system of Fig. 12 at any time by throwing the valve 103 into the position shown in Fig. 12a to admit the same gas from the treating tube 101 into both of the passages 95 and 96. This valve is so arranged as to perform another useful function. Thus, air is by-passed through the needle valve 103I and the valve passage 109 through the copper oxide tube 102 in reverse direction, then through the conduit 110, to the exhaust pump 99. This circulation of atmospheric air over the hot copper oxide in the tube 102 regenerates it by reoxidizing reduced copper back to copper oxide. Air enters the passage 109 through the valve 103I as shown, to limit the pressure and prevent air from also flowing through the tube 101 and consuming the carbon. Such flow of air from tube 102 to tube 101 can also be prevented by providing separate constrictions for tubes 101 and 102 instead of supplying them both from the single constriction 100.

One great advantage of low pressure operation in the system of Fig. 12 is the reduction of the lag between a change in composition of the mixture and an indication thereof by the instrument; but another very important advantage of the low pressure operation is the reduction in the rate of consumption of the carbon and the copper oxide in the treating tubes 101 and 102. As a matter of fact, the reduction in the pressure sometimes makes it feasible to employ a system utilizing these reagents where it would be utterly impracticable in operation at normal atmospheric pressures.

I find that it is sufficient and even preferable to heat copper oxide to a relatively low temperature from 300° (C.) to 400° (C.) at which only complete combustion of hydrogen and carbon monoxide is assured, while methane remains unaffected. As is known, for complete combustion of methane copper oxide should be heated to a temperature of 700° (C.) or more. However, the method can be practiced with very wide range of temperatures.

As long as the pump 99 is running, the exhaust gases in the system remain expanded, and the dew point of the gases is sufficiently low to prevent any condensation of water within the system. However, when the pump is stopped—if exhaust gas continued to flow through the restriction 100 until the system was filled at atmospheric pressure—the water vapor pressure might rise above the dew point, with resultant precipitation. It is important to prevent such condensation, since the water might remain for an indefinite period of time in the cells and cause damage to the insulation by corrosion. There are ways of preventing such condensation, one of which is to drive the suction pump 99 from the engine, the exhaust of which is being analyzed, so that the pump continues to operate as long as the fuel flow to the engine is continued. When the engine is stopped, either by cutting the ignition or shutting off the fuel flow, the engine normally will continue to rotate by its momentum long enough to scavenge from the exhaust manifold exhaust products high in water content, so that, by the time the engine and pump stop, the exhaust manifold 60 will be filled with air or air-fuel mixture containing only atmospheric humidity. Therefore, in the last period of operation relatively dry air will flow through the passages 95 and 96, while the pressure in those passages and in the cells is rising to atmospheric pressure, and condensation of water in the cells and passages will be effectively prevented.

In those instances in which the suction pump 99 is not directly coupled to the engine 54, the valve 98 may be employed to prevent condensation of liquids in the apparatus by rotating this valve counter-clockwise 90° shortly before or simultaneously with the shut-down of the pump 99. This admits atmospheric air through the port 98a to the junction 97, and thence back up into the passages 95 and 96, filling those passages and the cells associated therewith with atmospheric air at atmospheric pressure. To prevent a too rapid inrush of air into the cells, the passage 98I in the plug of the valve 98 may be made relatively small. It is possible for the filaments in the cells to be damaged by sudden admission of gas thereto at full atmospheric pressure.

In the system of Figs. 7, 10, 11, and 12, the constrictions serve as very effective means for preventing damage to the filaments (resistors) in the test cells from explosions in the exhaust manifold, which occasionally happen. Elimination of this danger makes it possible to use larger diffusion passages in the cells than would otherwise be safe.

Thermal-conductivity cells of the general type employed in the system so far described are well known, and many of the cells already in use can be adapted for operation in my system. However, I have developed a construction of cell that has special advantages, and which is disclosed and claimed in Patent No. 2,506,535, issued May 2, 1950.

Referring, first, to Fig. 14, there is disclosed a rear block 120 and a front block 121, which together define the cell chambers 88 to 91 and the passages 95 and 96 of Fig. 12. The meter 85 is mounted in front of the front block 121, and the bridge resistors 92 and 94 are positioned between the block 121 and the meter 85. These resistors 92 and 94 have their movable elements coupled by spur gears to control shafts 122 and 123, which extend forwardly alongside the meter 85 and terminate in control knobs 124 and 125, respectively. The valve 98 may have a control shaft 126 extending forwardly and having a control knob 127 on its forward end.

The valve shaft 126 is extended rearwardly of the valve 98 and connected to a switch 126I, which is closed when the valve is in the normal position shown in Fig. 12, but is open when valve 98 is in the position shown in Fig. 12a. The switch 126I may be the ignition switch of the engine or the power supply switch of an electric motor driving the suction pump, so that the shifting of the valve 98 occurs simultaneously with stoppage of the pump.

The valve 103 has its seat formed directly in the extension of rear block 120, and has a control shaft 128 on the end of which is mounted a control knob 129. The switch 86 is shown mounted on the rear block 120 and actuated through a control shaft 130 by a control knob 131.

The apparatus is particularly designed for mounting on the control panel of an aeroplane, and to this end the meter 85 and the shafts 122, 123, 126, 128, and 130 of the various controls project forwardly through apertures provided therefor in the instrument panel 132. A removable insert 133 is preferably provided in this instrument panel 132 to facilitate disassembly of the instrument. The rear block 120 may be mounted by screws or bolts, one of which is indicated at 134, to a rear supporting panel 135 positioned back of the instrument panel 132. The front block 121 is secured to the rear block 120 in sealing engagement therewith by a plurality of bolts 136. The conduit 110 may consist of a piece of tubing extending from the rear block 120 to the junction 97, which junction is formed by a single fitting 137 incorporating the valve 98 and adapted to be soldered or welded to the rear block 120.

Referring now to the face view of the rear block 120, shown in Fig. 16, and the sectional view of Fig. 17, it will be observed that the cell chambers for the gas are formed by registering depressions in the rear and front blocks. The passages 95 and 96 are formed completely within the rear block 120, both of these passages being of relatively large uniform diameter from the Y fitting 137 at the lower end of the block to a point adjacent the upper end of the block where they narrow gradually down to relatively small passages, passage 95 extending directly out of the top of the rear block 120 and being connected to a conduit 138 which will extend to the treating tube 101 of Fig. 12. Passage 96, after being tapered down to a small bore, communicates through the valve 103 with a conduit 139, which extends to the treating tube 102 of Fig. 12. Both of these conduits 138 and 139 may consist of what is commonly referred to as thermometer tubing, which is a flexible metal tubing of substantially 1 mm. in diameter and armored with a wrapping of wire. By employing a small diameter conduit of this type the block 120 may be mounted many feet from the treating tubes 101 and 102. This greatly facilitates the installation of the apparatus, since the treating tubes 101 and 102 would ordinarily be positioned closely adjacent the engine of an aeroplane some distance away from the cockpit or cabin where the instruments are located. If necessary to prevent condensation, the conduit can be heated, as by inclosing it in, or attaching it to a larger flexible tube through which hot gas such as exhaust gas is circulated.

The test chambers are formed between the rear and front blocks 120 and 121, as shown in Fig. 17. The recesses in the two blocks match in shape and dimensions, and, as shown in Fig. 16, there are two U-shaped recesses—the two arms of one of which constitute the chambers 88 and 89, respectively, and the two arms of the other of which constitute the chambers 90 and 91, respectively. The lower part of each U-shaped recess in the rear block is connected by diffusion passage with one of the passages 95 and 96. The diffusion passages are defined by a straight rearwardly extending cylindrical bore which, in this instance is shown to contain a plug 140 having four longitudinally extending grooves 141' in its surface. It is through the passages defined by these grooves 141' that the gases diffuse into the chambers 88 and 89, and 90 and 91.

As indicated in Fig. 12, there is a resistor positioned in each of the test chambers. These resistors are all identical, each consisting of a small helix of platinum wire 141 (Fig. 17) supported at opposite ends from lead-in wires 142, which extend through Kovar seals 144 having flanges 145 welded or soldered to the margins of bores 146 in which the Kovar seals are positioned—these bores extending from the front face of the front block 121 into the recesses in that block. The Kovar seals form gas-tight electrically insulating lead-in structures for the filament supporting pins 142. The construction described is highly desirable in practice because it permits accurate mounting and testing of the platinum filaments 141, while the front block 121 is removed from the rear block. Thereafter, the two blocks are assembled and bolted solidly together with the bolts 136.

As is customary in apparatus of this type, it is desirable to maintain the apparatus at a uniform temperature. To this end, additional recesses are provided in the blocks 120 and 121, which together define cylindrical channels 147 and 148 for the positioning of a thermostatic switch 149 and an electric heater 150, respectively; these two devices being connected in series with each other and with an energizing battery 151 through a switch 152 (Fig. 16). These elements 149 and 150 are of standard construction and need not be specifically described herein. Suffice it to say that the thermostatic switch 149 opens the circuit to the heater 150 when the temperature of the apparatus exceeds a desired value, and closes the circuit from the battery to the resistor when the temperature falls below the desired value.

It is essential to prevent gas leakage into the test passages and chambers, and it is preferable to employ a construction utilizing materials that do not absorb water or other vapors, and that are not apt to form films of materials having low vapor pressure. Thus, although at atmospheric pressure a substance having a vapor pressure of 1 mm. Hg may not cause sensible error in ordinary apparatus operated at atmospheric pressure, the same substance may cause great error when the total gas pressure is only 10 mm. Hg. This problem is relatively serious, because whereas apparatus adapted to operate at atmospheric pressure remains at its operating pressure continuously, the present apparatus working at reduced pressures will often be brought to the reduced pressure only for a relatively short period of use. Hence, any material capable of giving off vapor has to be removed before accurate measurements at reduced pressure can be performed.

To eliminate substantially all possibility of leakage into the test cells, I surround the U-shaped recesses in one or both of the blocks 120 and 121 with guard grooves 153, each of which is connected by a bore 154 in the rear block to the associated passage 95 or 96 at points below the cells. Hence, the space defined by these guard grooves 153 is continuously maintained at a pressure at least as low, and possibly lower, than the pressure within the test cells themselves, so that any leakage of air between the blocks 120 and 121 will, upon reaching the guard rings 153, be drawn off through the bores 154 before it can reach a test chamber and contaminate the gas therein. It is preferable to take similar precautions to prevent leakage of air along the sealing surfaces of the valve 103 to the valve passages by providing annular grooves 155 and 156 in the plug of the valve below and above the fluid passages therein, and connecting these grooves by a passage 157 in the rear block through a T fitting 1101 to the conduit 110 leading to the pump. Longitudinal grooves 1032 provided in the valve seat are in constant communication with the annular grooves 155 and 156. Since the space within the grooves 155, 156 and 1032 is maintained at a pressure at least as low as the pressure within any of the valve passages, there can be no incentive for leakage of air along the sealing surfaces of the valve to the gas passage 106 therein.

As best shown in Fig. 16, the marginal portions 1201 of the meeting surfaces of the two blocks are slightly depressed to receive a compressible gasket 1202 (Fig. 14), which can be compressed when the bolts 136 are tightened, without interfering with the close fit of the meeting surfaces immediately adjacent the cell chambers, which surfaces may be ground flat.

It is a relatively simple matter to test for the presence of extraneous substances within the test passages and chambers by varying the pressure therewithin. Thus, variation of the pressure to which the gases are expanded will not materially affect the deflection of the indicating meter as long as extraneous vapors or fume-producing materials are absent. Therefore, should the reading be found to vary in response to an increase in the pressure, and there is no leak into the cell, it is desirable to reduce the pressure to the lowest value obtainable for an interval of time to accelerate the evaporation and removal of the extraneous material, after which the pressure can be increased to a higher normal operating value. Variations in the pressure can be obtained by manipulating the valve 98 so as to reduce the rate of flow to the pump 99 and thereby permit the exhaust gas passing the restriction 100 (Fig. 12) to build up a higher pressure in the apparatus. The slight movement of valve 98 required to effect this can be had without opening the switch 1261.

As has been previously indicated, the apparatus so far described provides for transfer of the gas from passages 95 and 96 into the test chambers by diffusion through small openings provided in this instance by the grooves 141' in the plugs 140. It is old to transfer the gas to the test chambers in this fashion at normal pressures. An important feature of the present invention is the method of accelerating the migration of the gas between the passages 95 and 96 and the associated test chambers by greatly reducing the pressure. However, it is to be understood that the advantages of operating at reduced pressure are not limited to apparatus in which transfer of gas to and from the cells is effected by diffusion. In fact, the time lag may be reduced even further by positively circulating the gas through the cells at low pressure. The results are less accurate, because the heat loss by convection is increased, but the convection losses are smaller relative to the thermal-conductivity losses than they would be at normal pressures.

It is desirable to make the blocks 120 and 121 of metal because of its good heat conducting characteristisics. A metal should be chosen that is intrinsically corrosion resistant or it should be plated with a coat of corrosion resistant metal such as gold. It is also possible to employ glass in some instances.

A very important feature of the construction is the complete mounting of the filaments in the front block while the latter is removed from the rear block. This makes it possible to employ relatively small cells, which is advantageous, and yet accurately position the filaments axially within the cells. By virtue of the fact that the two blocks contact each other completely around the cells, there is no clearance to trap gas or liquid. Thus the guard grooves are at the same or lower pressure than the cells and prevent leakage of air into the cells not only because of the pressure conditions that exist but because the composition of the gas in a guard groove is substantially identical with that in the cell it surrounds.

In my construction, all wiring and adjustment rheostats can be mounted on the front plate and be maintained at uniform desired temperature by the thermoswitch and heater. This improves the stability of the instrument.

Manufacture of the blocks is facilitated by the fact that the front and rear blocks can be made interchangeable.

By virtue of the fact that the guard grooves are interposed between the cells and the gaskets, the latter can be of any desired material since any gases that might be given off by the gasket would be trapped in the guard grooves.

In manufacture, the front blocks containing the filaments can be quickly tested in the factory immediately after their assembly by placing the blocks against a fixed test block corresponding to the rear block of the instrument but permanently mounted in the factory for testing purposes only.

All parts can be readily cleaned and restored to proper operating condition, since by removing the front block containing the filaments and having all the electrical equipment mounted thereon, it can be checked without disturbing the rear block and the gas lines connected thereto. With the front block removed, the recesses in the rear block are accessible for cleaning with the rear block in situ. By substituting a dummy front block, the passages in the rear block and in the gas lines can be cleaned by flushing them with a solvent, such as carbon tetrachloride. However, it is to be understood that cleaning is seldom necessary when operating at the low pressures I employ.

Heretofore, no attempt has been made to specifically describe the constrictions employed to restrict the flow of gas and thereby expand it. Various types can be employed. Thus, it is possible to use a single very small orifice, but this is ordinarily objectionable because it must be so small that it is subject to clogging. Another type that may be employed is a series of orifices, in which case they may be made larger and be less subject to clogging. Where a series of orifices is employed, the pressure drop across each orifice preferably should be at least half that across the preceding orifice to prevent back diffusion of the gas in the passage between successive orifices.

Still another constriction that may be employed is a length of capillary tubing, or a capillary tube with a wire in it to further reduce the flow space. This latter arrangement has the advantage that the wire can be moved to facilitate cleaning.

A constriction that is advantageous is disclosed in Fig. 18. It is shown mounted in the wall 160 of a chamber or passage. Thus, it might be the wall of the exhaust manifold 69 in Fig. 12. The wall 160 is provided with a bore 161 counterbored and threaded on the outer side to receive a compression nut 162, which forces a flange 163 on a bushing 164 against a sealing surface 165 on the wall 160. The bushing 164 is joined at its outer end to the flexible conduit 138 previously described, and has a relatively small bore 166 extending from its outer end into a larger counterbore 167 at the inner end. This counterbore 167 contains a plug 168 accurately fitted therein by grinding, the plug having a shallow helical groove 169 in its outer surface extending from end to end thereof and communicating the small bore 166 with the end of the counterbore 167. This helical groove 169 is of sufficiently small cross-section and sufficient length in the direction of flow to provide the necessary reduction in flow of the gas therethrough. The inner end of the bushing 164 may be covered with a cap 170 which is apertured at its outer end, but retains a filter block 171 against the end of the bushing 164. This filter block 171 may be made of Alundum, or other suitable refractory porous material, and kept at elevated temperature to reduce absorption.

So far only fixed constrictions have been discussed. Sometimes it may be desirable to adjust the rate of flow so that it can be reduced to an extremely low value or stopped entirely until the pump has produced the desired vacuum in the cells. Obviously manually adjustable needle valves can be substituted for the fixed constrictions where the conditions of operation make manual adjustment feasible. It may also be practicable to employ automatic pressure reducing valves in place of a manual valve or a fixed constriction. Such a valve would remain closed until the pressure had been reduced to the desired low value by the pump, whereupon it would open as necessary to maintain such flow as would be required to keep the pressure constant. Many such expansion valves are well known and are in common use.

A special form of self-adjusting constriction is disclosed in Fig. 19, in which a body member 190 has a bore 191 through which the gas flows from top to bottom, the body member 190 being shown mounted in a well 192 of a pipe or chamber from which gas is to be taken. The lower end of the bore 191 merges into a larger bore 193 which may communicate with the tubing 138. A plug 194, having a helical groove 195 in its outer surface, is slidably mounted in the bore 191 and is urged upwardly by a helical spring 200 which is compressed between the upper end of the body member 190 and a disc 196 secured to the upper end of a stem 197, which extends upwardly from the slidable plug 194. A stop 198 may limit upward movement of the plug.

In operation, the suction of the pump tends to pull the plug 194 downward against the force exerted by the spring 200 and, as the lower end of the plug 194 moves into the larger bore 193, the effective length of the gas passage defined by the helical groove 195 is reduced, thereby increasing the flow of gas. As a result, the plug 194 will find a position of equilibrium in which the flow of gas is sufficient to maintain a desired pressure in the bore 193 and the tubing 138.

It is worth noting that when a manually operated valve is substituted for the constrictions described, advantages can be had by reducing the flow to a very small value except at times when adjustment (as of the carburetor) is to be made, when the valve may be opened to increase the flow while adjustment is being made. This procedure increases the effective life of the apparatus, particularly when reagents, such as carbon or copper oxide, are employed.

It may be possible in some instances when employing reagents in the gas lines to the cells to so construct the reagent chambers and so pack the reagents in the chambers that they themselves offer sufficient resistance to the flow of gas to reduce the pressure to the desired value.

It is apparent from Fig. 13 that a given departure from theoretical ratio on the rich side produces a much greater change in thermal-conductivity than the same departure on the lean side. It is desirable, therefore, to use a meter having an asymmetric scale in which the "lean" range is shorter than the "rich" range, as shown in Figs. 12 and 15. However, to prevent excessive asymmetry in the scale I prefer to bias the movement of the meter so that it is less sensitive within the "rich" range than within the "lean" range. One way of doing this is to provide an auxiliary hair spring 180 (Figs. 15 and 15a) which has one end anchored to the meter frame by a post 1801 and the other end 1802 secured to an auxiliary pivoted shaft 1803 coaxial with the meter shaft 1804 and having an arm 1805 bent at right angles into the path of the hand 182 and positioned to just rest against the hand when the latter is in zero or "T" position. Movement of the hand clockwise from "T" position is resisted by the auxiliary spring 180, but the latter offers no resistance to counterclockwise movement into the "lean" range. It is to be understood that the auxiliary spring 180 is supplementary to the usual restoring hair spring (not shown in the drawing), which resists displacement of the hand in either direction equally.

It is not to be inferred from the showing of the invention with an aircraft engine having a supercharger in Fig. 7 that the invention is in any sense limited to engines so equipped. As was indicated early in the description, the accuracy of my apparatus is substantialy unaffected by ordinary pressure variations in the test cells.

To properly explain the invention, several embodiments thereof have been described in detail, but it is to be understood that the invention is not limited to the particular embodiments shown but only to the extent set forth in the appended claims.

Where the word "diffuse" is used in the claims it refers to the movement of gases resulting from the inherent random motion of the molecules as distinct from movement of gases resulting from externally applied mechanical forces or pressures, or by the action of gravity. In this connection circulation of gases by thermal convection results from the action of gravity and not by diffusion, as the word is here used.

Where the expression "small cell" is used in the claims, it refers to a cell of sufficiently small dimensions that the cooling of the resistor by thermal convection can be made negligible relative to the cooling by thermal conductivity at atmospheric pressure or greater, and to a cell the gas transfer passage of which is of such size, shape, and position relative to the heated element and the walls of the cell that the cooling effect on the element by forced convection incidental to transfer of the gas to be analyzed to and from the cell is limited to a small fraction of the total length of heated element.

I claim:

1. In the analysis of a gas of variable composition and under substantially atmospheric pressure or greater, utilizing transfer of gas between a flow pipe and a small cell housing a temperature-sensitive resistance element which is substantially greater in length than twice the spacing between it and the walls of the cell, the method of shortening the time lag of response to a change in gas composition which comprises:

expanding the gas within said pipe and cell to a pressure less than half atmospheric but greater than the pressure for which the length of the mean free path of the gas becomes comparable in magnitude to the spacing between said element and the walls of the cell, and increasing the rate of said transfer and the velocity of flow through said pipe.

2. In the analysis of a gas of variable composition and under substantially atmospheric pressure or greater, utilizing transfer of gas between a flow pipe and a small cell housing a temperature-sensitive resistance element spaced from the walls of the cell, the method of shortening the time lag of response to a change in gas composition which comprises: expanding the gas within said pipe and cell to a pressure less than half atmospheric but greater than the pressure for which the length of mean free path of the gas becomes comparable in magnitude to the spacing between said element and the walls of said cell, increasing the velocity of flow through said pipe and effecting said transfer substantially entirely by diffusion at said low pressure.

3. In gas analysis apparatus: a small cell housing an elongated temperature-sensitive resistance element; gas conduit means for transferring a gas to be analyzed to and from said cell; suction means on the down-stream end of said conduit and flow-restricting means in the upstream end of said conduit with respect to the position of said cell, the capacity of said suction means and the dimensions of said flow-restricting means being proportioned to lower the pressure in said conduit and said cell from substantially atmospheric pressure or greater to a value less than half atmospheric but greater than the pressure for which the mean free path of the gas being tested becomes comparable in magnitude to the spacing between said element and the walls of the cell; a diffusion passage connecting said cell to said gas conduit means, the cross-sectional dimensions of said diffusion passage being small relative to the length of said element, whereby the transfer of the gas between said conduit means and said cell is substantially limited to diffusion at said low pressure and the mass rate of said transfer is automatically maintained constant substantially independent of change in pressure.

4. In gas analysis apparatus: a small cell housing a temperature-sensitive resistance element which is substantially greater in length than twice the spacing between it and the walls of the cell; gas conduit means for transferring a gas to be analyzed to and from said cell; suction means on the downstream end of said conduit means and flow-restricting means in the upstream portion of said conduit means with respect to the position of said cell, the capacity of said suction means and the dimensions of said flow-restricting means being proportioned to lower the pressure in said conduit means and said cell from substantially atmospheric to a value less than half atmospheric but greater than the pressure for which the mean free path of the gas being tested becomes comparable in magnitude to the spacing between said element and the walls of the cell, said gas conduit means extending from a source spaced a substantial distance from said cell, said flow-restricting means being positioned at the inlet end of said gas conduit means, and the said gas conduit means being of such bore that the time of sweep therethrough of the gas approaching the cell is negligible relative to the total time lag of response of the apparatus to a change in gas composition.

5. Apparatus according to claim 4 in which said source includes means for maintaining circulation of the gas adjacent to the inlet end of said flow-restricting means to prevent selective diffusion of different components of the gas through said restricting means.

6. Apparatus according to claim 5 in which said source comprises a conduit and means for producing a stream of the gas therethrough, and said flow-restricting means is positioned with its inlet end directly in said stream.

7. The method of operating a gas analysis cell of the thermal-conductivity type to continuously analyze a gas stream that is above ambient temperature and above the temperature of said cell and that contains a constituent that is gaseous at the temperature of said stream but is condensable at the temperature of said cell at atmospheric pressure, said method comprising: continuously diverting gas from said stream, expanding it while above ambient temperature sufficiently to lower the dew point of said constituent below the temperature of said cell, and supplying said expanded gas to said cell.

8. In apparatus for analyzing a gas mixture resulting from the combustion of a fuel with atmospheric air: an electrical bridge circuit having first and second thermal-conductivity cells in different arms thereof; means for supplying a portion of said gas mixture to be analyzed to said first cell at a sub-ambient pressure at which water in the mixture remains in vapor phase; and means for supplying a portion of such atmospheric air to said second cell at a sub-ambient pressure; whereby the effect on said first cell of moisture initially present in the air is substantially neutralized.

9. In a method of analyzing, in a thermal-conductivity type cell, a gas mixture containing a constituent in an amount that is condensable at the temperature of said cell at atmospheric pressure, the steps which comprise diverting a stream of said mixture from a gas stream that is above the temperature of the cell, continuously expanding said diverted stream to a pressure at which said constituent is maintained in vapor phase, and supplying said expanded mixture to the cell while maintaining said constituent in vapor phase.

10. The method of analyzing, in a thermal conductivity type cell, the combustion product of a fuel-air mixture containing an amount of moisture that is condensible at the temperature of said cell at atmospheric pressure, which comprises: diverting a stream of said combustion product from a gas stream that is above the temperature of the cell, continuously expanding said diverted stream to a pressure at which said moisture is maintained in vapor phase, and supplying said expanded combustion product to the cell while maintaining said moisture in vapor phase.

11. The method of analyzing the combustion product of a fuel-air mixture as defined in claim 10 which comprises heating the expanded mixture at the point of diversion thereof from said gas stream to prevent lowering of the temperature of the diverted stream below the dew point thereof of the combustion product.

12. The method of determining the fuel-air ratio of the input mixture supplied to a combustion device with thermal-conductivity apparatus including a meter having a "lean" and a "rich" range extending in opposite directions from an intermediate point indicating theoretical ratio for complete combustion, which method comprises: first measuring the thermal-conductivity of exhaust gas from the combustion device and adjusting the fuel-air ratio of the input mixture until said apparatus indicates minimum thermal-conductivity; and thereafter measuring the thermal-conductivity of the input mixture with said meter, and adjusting said apparatus to cause said meter to indicate said theoretical ratio immediately following the changeover from exhaust gas to input mixture.

13. Thermal-conductivity gas analysis apparatus comprising: a Wheatstone bridge circuit; a small cell housing a temperature-sensitive resistance element spaced from the walls of the cell and connected in one arm of said bridge circuit; means connected in said bridge circuit for indicating changes in resistance of said element; means for supplying gas to be analyzed from a source at substantially atmospheric pressure or greater to said cell at a pressure greatly reduced below atmospheric pressure but above the pressure at which the length of the mean free path of the gas is of a lower order of magnitude than the spacing between said element and the walls of said cell, said means including a gas conduit communicating with said cell and having flow-restricting means upstream from said cell and suction means downstream from said cell, the size of said flow-restricting means and the capacity of said suction means being such that the velocity of gas flow through the gas conduit adjacent to the cell is increased substantially in proportion to the degree of expansion of the gas below atmospheric pressure.

14. Thermal-conductivity gas analysis apparatus comprising: an electric bridge circuit; a small cell housing a temperature-sensitive resistance element spaced from the walls of the cell and connected in one arm of said bridge circuit; a variable resistor in another arm of said bridge opposing said one arm; means for supplying gas to be analyzed from a source at substantially atmospheric pressure or greater to said cell at a pressure between half atmospheric and the pressure at which the length of the mean free path of the gas is of a lower order of magnitude than the spacing between said element and the walls of said cell, said means including a gas conduit communicating with said cell and having flow-restricting means up-stream from said cell and suction means down-stream from said cell, the size of said restricting means and the capacity of said suction means being such that the velocity of gas flow through the gas conduit adjacent to the cell is increased substantially in proportion to the degree of expansion of the gas below atmospheric pressure.

15. Apparatus according to claim 14 including means for stabilizing the pressure in said cell at a desired pressure of operation.

16. In the analysis of a gas of variable composition and under substantially atmospheric pressure or greater, utilizing transfer of gas between a flow line and a cell housing a temperature-sensitive resistance element spaced from the walls of the cell, which cell has substantial convection losses at half atmospheric pressure, the method of shortening the time lag of response to a change in gas composition which comprises: expanding the gas as it enters said line and said cell maintaining said pressure above the value of the pressure at which the mean free path of the gas becomes comparable in magnitude to the spacing between said element and the walls of the cell, maintaining said pressure below the value of the pressure at which thermal convection losses become negligible, and measuring a change in said element resulting from a change in gas composition while said pressure is maintained between said two pressure valves.

17. In combination with a main conduit adapted to carry a stream of gas of variable composition, a branch conduit, flow-restricting means providing communication between the upstream end of said branch conduit and said main conduit at a point intermediate the ends of the latter, said flow-restricting means being located at the junction of said branch conduit and said main conduit and being exposed to said stream of gas whereby a change in composition of the gas flowing in said main conduit results in an immediate change in composition of the gas entering said branch conduit, an elongated cell housing a temperature-sensitive resistance element, said cell having an orifice on one side thereof, said orifice having cross-sectional dimensions small compared with the length of said element, said orifice being in communication with said branch conduit intermediate the ends thereof, and suction means connected to said branch conduit downstream from the connection to said cell, said suction means being operative to expand the gas entering said branch conduit and to increase the velocity of flow of gas past said cell whereby said element responds quickly to changes in composition of the gas flowing in said main conduit.

18. In combination with a main conduit adapted to carry a stream of gas of variable composition, a branch conduit, flow-restricting means providing communication between the upstream end of said branch conduit and said main conduit at a point intermediate the ends of the latter, said flow-restricting means being located at the junction of said branch conduit and said main conduit and being exposed directly to said stream of gas whereby a change in composition of the gas flowing in said main conduit results in an immediate change in composition of the gas entering said branch conduit, a small cell housing an element responsive to the thermal conductivity of gas in the cell, passage-defining means providing communication between said cell and said branch conduit at a point intermediate the ends thereof, the passage defined by said passage-defining means being narrow relative to the dimensions of said element, whereby forced convection of gas between said element and said branch conduit is substantially eliminated and the exchange of gas between said branch conduit and said cell is limited substantially entirely to diffusion, and suction means connected to said branch conduit downstream from said narrow-passage-defining means said suction means being operative to expand the gas entering said branch conduit and to increase the rate of flow of gas past said passage whereby said element responds quickly to changes in composition of the gas flowing in said main conduit.

19. In combination with a main conduit adapted to carry a stream of gas of variable composition, a branch conduit, flow-restricting means providing communication between the upstream end of said branch conduit and said main conduit at a point intermediate the ends of the latter, said flow-restricting means being located at said main conduit whereby a change in composition of the gas flowing in said main conduit results in an immediate change in composition of the gas entering said branch conduit, a small elongated cell, an elongated temperature-sensitive resistance element mounted along the length of said cell and in spaced relationship to the walls thereof, said resistance element having a length substantially greater than the width of said cell, passage-defining means providing direct communication between only one end of said cell and said branch conduit at a point intermediate the ends thereof, and suction means connected to said branch conduit downstream from said passage-defining means, said suction means being operative to expand the gas entering said branch conduit and to increase the rate of flow of gas past said passage-defining means whereby said element responds quickly to changes in composition of the gas flowing in said main conduit.

20. Apparatus as defined in claim 19 wherein the passages defined by said passage-defining means are narrow.

21. In combination with a main conduit adapted to carry a stream of gas of variable composition at substantially atmospheric pressure or greater, a branch conduit, flow-restricting means providing communication between the upstream end of said branch conduit and said main conduit at a point intermediate the ends of the latter, a test cell housing a temperature-sensitive resistance element in communication with said branch conduit intermediate the ends thereof, a reaction cell adapted to contain a charge of solid reagent positioned in said branch conduit intermediate said flow-restricting means and said test cell for modifying the composition of the gas prior to its entry into said test cell, and suction means connected to said branch conduit downstream from said test cell, said suction means being operative to expand the gas entering said branch conduit and to greatly reduce its pressure below atmospheric, whereby the consumption of said solid reagent is reduced and the response of said cell is accelerated.

22. Apparatus as defined in claim 21 wherein said flow-restricting means is located at said main conduit whereby a change in composition of the gas flowing in said main conduit results in an immediate change in composition of the gas entering said branch conduit.

23. In apparatus for comparing the thermal conductivity of a gas of variable composition flowing in a first main conduit with the thermal conductivity of a mixture of gases having unequal diffusion rates, the combination therewith of a second main conduit, means for drawing a stream of said reference gas through said second main conduit, a pair of branch conduits corresponding respectively with said two main conduits, a pair of flow-restricting means providing communication between the upstream ends of the respective branch conduits and the corresponding main conduits intermediate the ends of each of the latter, said flow-restricting means being located at said main conduits, a bridge circuit comprising a pair of temperature-sensitive resistance elements connected in adjacent arms thereof and including means for indicating differences in the resistances of said elements, a pair of means housing the respective resistance elements and exposing said elements to gas flowing in the respective branch conduits, and common suction means connected to said branch conduits downstream from said housing means, said suction means being operative to reduce the pressure of the gas entering the respective branch circuits to a common value and to prevent diffusion of gas from either branch conduit into the housing means exposing a resistance element to gas in the other branch conduit.

24. In apparatus for ascertaining changes occurring in the composition of a gas mixture flowing through a main conduit past a treatment section, a pair of branch conduits corresponding respectively with two portions of said main conduit which are respectively upstream and downstream from said treatment section, a pair of flow-restricting means providing communication between the upstream ends of the respective branch conduits and the corresponding portions of said main conduit, said flow-restricting means being located at said main conduits, a bridge circuit comprising a pair of temperature-sensitive resistance elements connected in adjacent arms thereof and including means for indicating differences in the resistances of said elements, a pair of cells housing the respective resistance elements and exposing said elements to gas flowing in the respective branch conduits, and common suction means connected to said branch conduits downstream from said housing means, said suction means being operative to reduce the pressure of the gas entering the respective branch conduits to a common value and to prevent diffusion of gas from either branch conduit into the housing means exposing a resistance element to gas in the other branch conduit.

25. In combination with a main conduit and means for flowing air through said conduit and means for injecting fuel into the air at a point intermediate the ends of said main conduit, apparatus for ascertaining fuel-air ratio of the mixture of gases downstream from said point, which comprises a pair of branch conduits corresponding respectively with two portions of said main conduit which are respectively upstream and downstream from said point, a pair of flow-restricting means providing communication between the upstream ends of the respective branch conduits and the corresponding portions of said main conduit, said flow-restricting means being located at said main conduits, a bridge circuit comprising a pair of temperature-sensitive resistance elements connected in adjacent arms thereof and including means for indicating differences in the resistances of said elements, a pair of means housing the respective resistance elements and exposing the elements to the air and the fuel-air mixture flowing in the respective branch conduits, and common suction means connected to said branch conduits downstream from said housing means, said suction means being operative to reduce the pressure of the gas entering the respective branch conduits to a common value and to prevent diffusion of gas from either branch conduit into the housing means exposing a resistance element to gas in the other branch conduit.

26. In combination with a combustion engine and means for supplying fuel to said engine and an inlet conduit for drawing air into said engine and an outlet conduit for discharging combustion products into the atmosphere, apparatus for comparing the thermal conductivity of such combustion products with air comprising a pair of branch conduits corresponding respectively to said inlet and outlet conduits, a pair of flow-restricting means providing communication between the upstream ends of the two branch conduits and the inlet and outlet conduits respectively, said flow-restricting means being located at said inlet and outlet conduits, a bridge circuit comprising a pair of temperature-sensitive resistance elements connected in adjacent arms thereof and including means for indicating differences in the resistances of said elements, a pair of means housing the respective resistance elements and exposing the elements to the air and the combustion products flowing in the respective branch conduits, and common suction means connected to said branch conduits downstream from said housing means, said suction means being operative to reduce the pressure of the gas entering the respective branch conduits to a common value and to prevent diffusion of gas from either branch conduit into the housing means exposing a resistance element to gas in the other branch conduit.

WLADIMIR M. ZAIKOWSKY.

REFERENCES CITED

The following references are of record in the file of this patent:

UNITED STATES PATENTS

| Number | Name | Date |
|---|---|---|
| 1,333,850 | Kennedy | Mar. 16, 1920 |
| 1,644,951 | Rodhe | Oct. 11, 1927 |
| 1,681,047 | Porter | Aug. 14, 1928 |
| 1,707,624 | Brown | Apr. 2, 1929 |
| 1,770,059 | Barber | July 8, 1930 |
| 1,954,681 | Oetjen | Apr. 10, 1934 |
| 1,971,038 | Hamilton | Aug. 21, 1934 |
| 2,000,119 | Brown et al. | May 7, 1935 |
| 2,025,121 | Minter | Dec. 24, 1935 |
| 2,077,538 | Wait | Apr. 20, 1937 |
| 2,269,850 | Hebler | Jan. 13, 1942 |

FOREIGN PATENTS

| Number | Country | Date |
|---|---|---|
| 465,367 | Germany | Sept. 15, 1928 |
| 9,351 | Great Britain | 1906 |